United States Patent [19]

Inazumi

[11] Patent Number: 5,751,904
[45] Date of Patent: May 12, 1998

[54] SPEECH RECOGNITION SYSTEM USING NEURAL NETWORKS

[75] Inventor: Mitsuhiro Inazumi, Suwa, Japan

[73] Assignee: Seiko Epson Corporation, Tokyo, Japan

[21] Appl. No.: 641,268

[22] Filed: Apr. 30, 1996

Related U.S. Application Data

[63] Continuation of Ser. No. 78,027, Jun. 18, 1993, abandoned.

[30] Foreign Application Priority Data

| Jun. 18, 1992 | [JP] | Japan | 4-159442 |
| Jun. 19, 1992 | [JP] | Japan | 4-161074 |
| Aug. 12, 1992 | [JP] | Japan | 4-215266 |

[51] Int. Cl.$^6$ .................................................. G10L 5/06
[52] U.S. Cl. .................................. 395/2.41; 395/2.55
[58] Field of Search ............................ 395/2, 2.11, 2.41, 395/2.68, 2.65, 2.69, 22, 23, 24, 2.09

[56] References Cited

U.S. PATENT DOCUMENTS

| 3,610,831 | 10/1971 | Moshier | 395/2.41 |
| 5,255,342 | 10/1993 | Nitta | 395/2 |
| 5,263,097 | 11/1993 | Katz et al. | 382/48 |
| 5,307,444 | 4/1994 | Tsuboka | 395/22 |
| 5,377,305 | 12/1994 | Russo | 395/11 |

FOREIGN PATENT DOCUMENTS

| 0 362 840 | 4/1990 | European Pat. Off. | G06F 15/80 |
| 0 374 604 A3 | 6/1990 | European Pat. Off. | G10L 9/16 |

OTHER PUBLICATIONS

Interactive Query Learning for Isolated Speech Recognition Hwang et al. Sep. 1992 IEEE.

Phoneme–based Word Recognition by NN—A Step Toward Large Vacab. Recognition. Hirai et al. IEEE/Jun. 1990.

Modularity and Scaling in Large Phonemic Neural Networks Waibel et al. IEEE/Dec. 1989.

Aijaz A. Baloch et al.; "A Neural System for Behavioral Conditioning of Mobile Robots;" IJCNN International Joint Conference on Neural Networks; San Diego, Jun. 17–21, 1990; pp. II–723 to II–728.

Tony Robinson et al.; "A recurrent error propagation network speech recognition system;" 8300 Computer Speech & Language 5(1991) Jul., No. 3, London, GB; pp. 259–274.

Yoshua Bengio et al.; "Learning the dynamic nature of speech with back–propagation for sequences;" 8221 Pattern Recognition Letters 13(1992) May, No. 5, Amsterdam, NL; pp. 375–385.

Takehisa Tanaka; "A Complex Sequence Recognition Model" IJCNN International Joint Conference on Neural Networks, Baltimore, MD, Jun. 7–11, 1992 vol. 4, pp. IV–201–IV–207.

*Primary Examiner*—Allen R. MacDonald
*Assistant Examiner*—Richemond Dorvil
*Attorney, Agent, or Firm*—Oliff & Berridge

[57] ABSTRACT

A speech recognition system can recognize a plurality of voice data having different patterns. The speech recognition system has a voice recognizing and processing device including a plurality of speech recognition neural networks that have previously learned different voice patterns to recognize given voice data. Each of the speech recognition neutral networks is adapted to judge whether or not input voice data coincides with one of the voice data to be recognized. Each neural network then outputs adaptation judgment data representing the adaptation in speech recognition. A selector responsive to the adaptation judgment data from each of the speech recognition neural networks selects one of the neural networks that has the highest adaptation in speech recognition. An output control device outputs the result of speech recognition from the speech recognition neural network selected by the selector.

26 Claims, 18 Drawing Sheets

AFFIRMATIVE DATA

NEGATIVE DATA

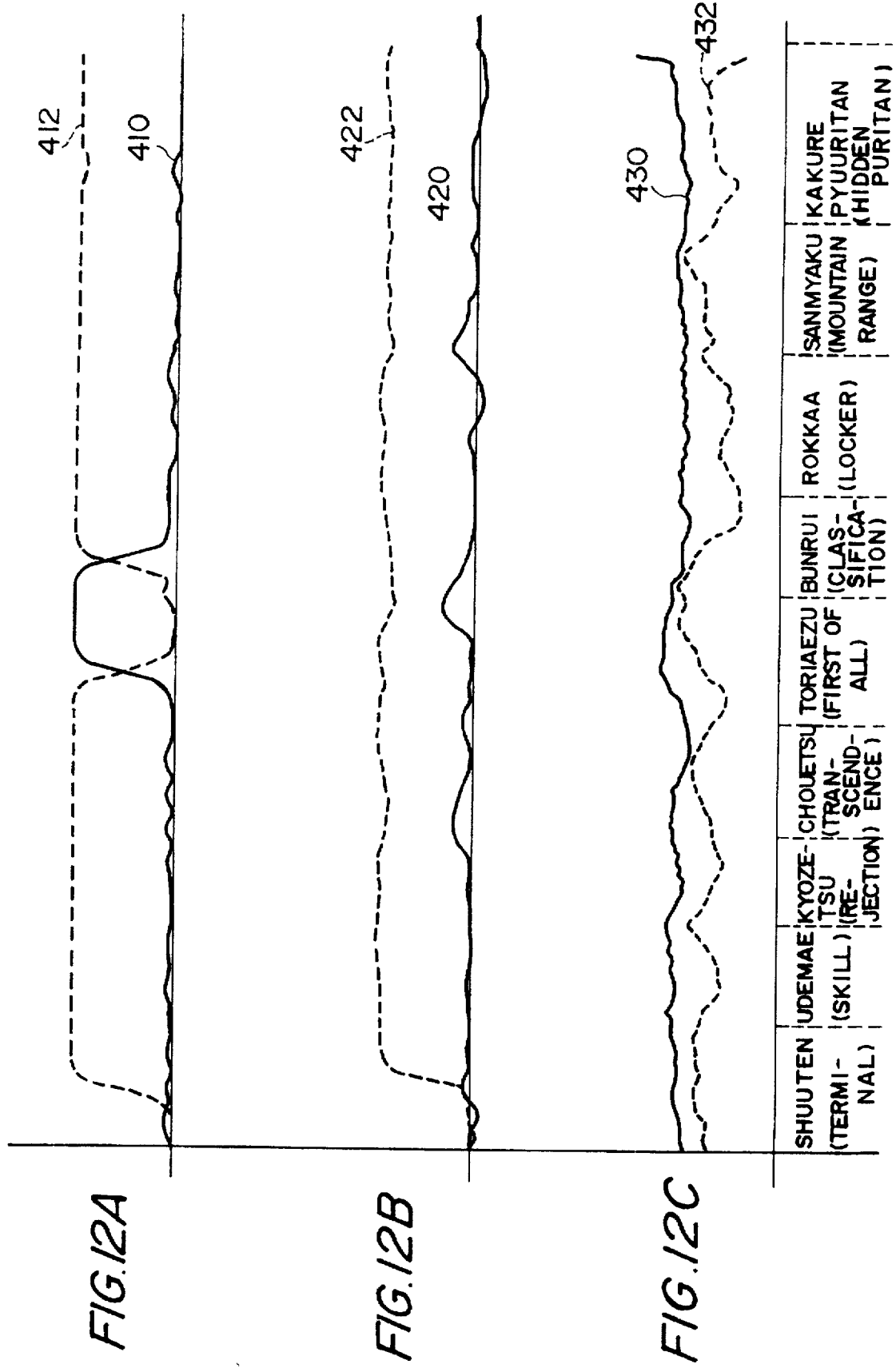

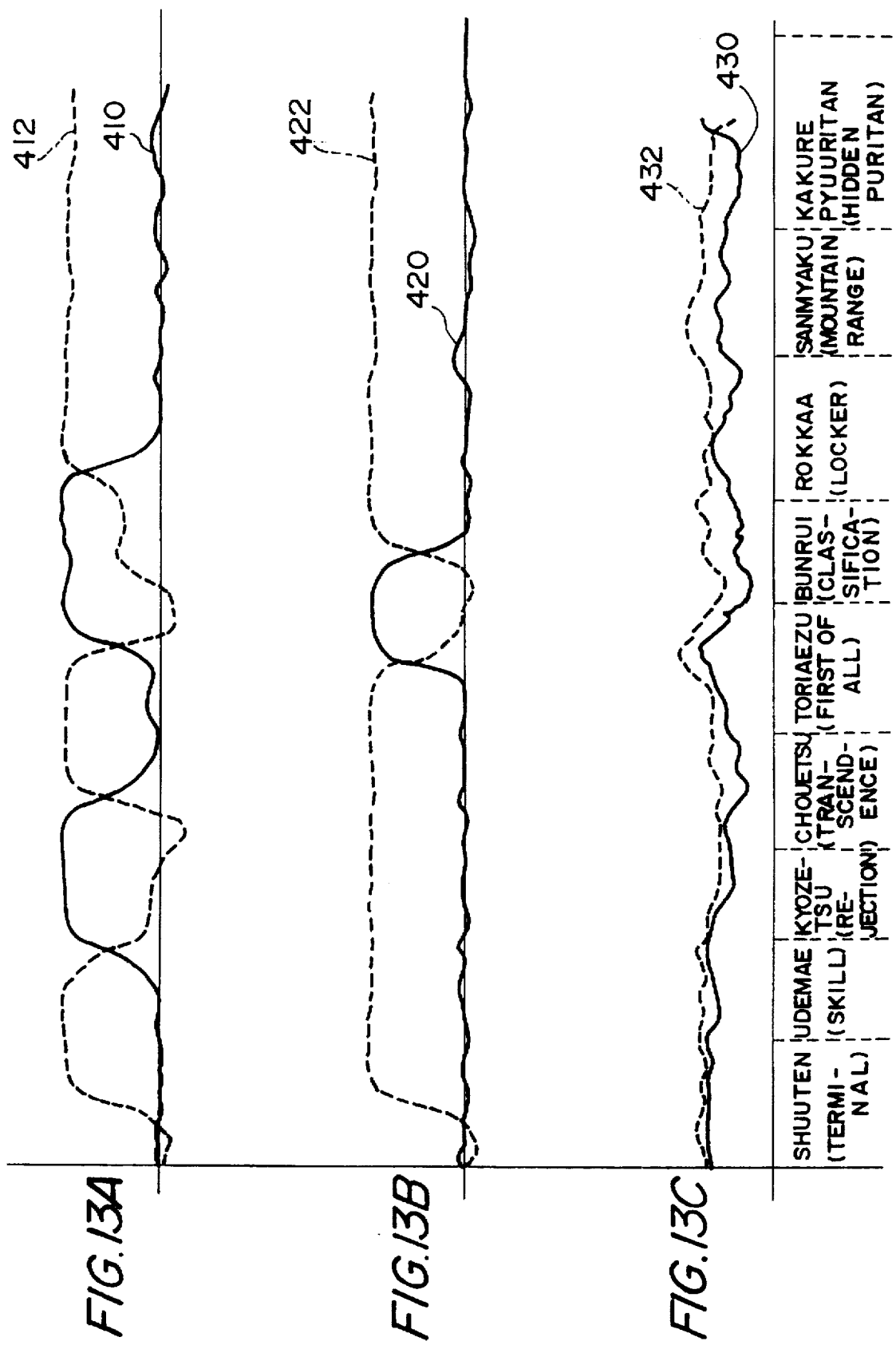

SPEECH RECOGNITION SYSTEM USING NEURAL NETWORKS

This is a Continuation of application Ser. No. 08/078,027 filed Jun. 18, 1993, now abandoned.

BACKGROUND OF THE INVENTION

1. Field of the Invention

The present invention relates to a speech recognition system using a neural network.

2. Description of the Related Art

Techniques practically used in the conventional speech recognition systems are classified broadly into two techniques of DP matching and hidden Markov model (HMM). The details of these techniques are described, for example, in NAKAGAWA Seiichi, "Speech Recognition By Stochastic Model".

In short, the DP matching process assumes the correspondence between the beginning and terminating ends of input and standard data, the contents thereof being transformed by the use of various time normalizing functions. The minimum difference between the transformed patterns and the distance therebetween are judged to be lost points in the standard pattern. From a plurality of standard patterns, a standard pattern having the minimum number of lost points is selected to be the result of matching.

On the other hand, the HMM process performs the speech recognition through a stochastic process. An HMM model corresponding to a standard pattern in the DP process is established. One HMM model comprises a plurality of states and a plurality of transitions. Existence probability is given to the respective one of the states while transition and output probabilities are provided to the respective one of the transitions. Thus, a probability at which a certain HMM model generates a time series pattern can be calculated.

The characteristics of voice data varies from one speaker to another. If speakers are different in sex or age from one another, such as man and woman or such as adult and child and even when the same sentence (or word) is read aloud by them, the voice data will include fully different voice patterns. The conventional speech recognition systems constructed by using the voice data of a particular speaker as learning data could hardly recognize the voice data of any other speaker having very different voice pattern.

SUMMARY OF THE INVENTION

It is therefore an object of the present invention to provide a speech recognition system which can exactly recognize voice data of different voice patterns.

Another object of the present invention is to provide a speech recognition system capable of recognizing a speaker by inputted voice deta.

To this end, the present invention provides a speech recognition system comprising:

voice recognizing and processing means including a plurality of speech recognition neural networks that have previously learned different voice patterns to recognize given voice data, each of said speech recognition neural networks being adapted to judge whether or not a piece of input voice data is coincide with one of the voice data to be recognized and to output adaptation judgment data representing the adaptation in speech recognition;

selector means responsive to the adaptation judgment data from each of said speech recognition neural networks for selecting one of said neural networks that has the highest adaptation in speech recognition; and output control means for outputting the result of speech recognition from the speech recognition neural network selected by said selector means.

Preferably, the speech recognition system further comprises feature extracting means for cutting the inputted voice data into each frame and transforming it into a feature vector, the transformed feature vectors being sequentially outputted from said feature extracting means, and each of said speech recognition neural networks is adapted to receive the feature vectors from said feature extracting means as voice data.

Preferably, each of said speech recognition neural networks comprises a plurality of neurons connected to one another and set at an internal state value X, each of said neurons being formed as a dynamic neuron, the internal value X being adapted to vary according to time for satisfaying a function X=G (X, $Z_j$) represented by the use of the internal state value X and input data $Z_j$ (j=0, 1, 2, . . . , n where n is a natural number) provided to that neuron, each of said dynamic neuron being adapted to convert the internal state value X into a value which satisfies the function F(X) and to output said converted value as an output signal.

The function X=G (X, $Z_j$) is represented by:

$$\tau \frac{d}{dt} X = -X + \sum_{j=1}^{n} Z_j$$

The function X=G (X, $Z_j$) can also be represented by:

$$\tau \frac{d}{dt} X_i = -X_i + \sum_{j=1}^{n} W_{ij} Y_j + D_i + \theta_i$$

where $W_{ij}$ is strength in joining the output of the j-th neuron to the input of the i-th neuron; $D_i$ is an external input value; and $\theta_i$ is a biasing value.

The function X=G (X, $Z_j$) can further be represented by the following formula using the sigmoid function S:

$$\tau \frac{d}{dt} X = -X + S\left( \sum_{j=1}^{n} Z_j \right)$$

The function X=G (X, $Z_j$) can further be represented by:

$$\tau \frac{d}{dt} X_i = -X_i + S\left( \sum_{j=1}^{n} W_{ij} Y_j + D_i + \theta_i \right)$$

In the formula 8, the sigmoid function S is used where $W_{ij}$ is strength in joining the output of the j-th neuron to the input of the i-th neuron; $D_i$ is an external input value; and $\theta_i$ is a biasing value.

Each of the speech recognition neural networks can comprise an input neuron for receiving the voice data, a recognition result output neuron for outputting the result of voice data recognition and an adaptation output neuron for outputting adaptation judgment data, said adaptation output neuron being adapted to infer voice data to be inputted to said input neuron and to output the inferred data as adaptation judgment data.

The selector means can be adapted to compute the adaptation of the inferred data relative to the actual voice data as adaptation in speech recognition.

The function F (X) can be either of sigmoid function or threshold function.

Each of the dynamic neurons can receive input data $Z_j$ formed by multiplying and feedbacking its own output by its own weight or by multiplying its own weight by the output of any other neuron. Alternatively, the input data $Z_j$ to the dynamic neuron can be any desired data externally provided.

In the speech recognition system of the present invention, the input voice data is given to all the speech recognition neural networks in the speech recognition means. Each of the speech recognition neural networks recognizes and processes the input voice data and also computes the adaptation judgment data between the input voice data and the voice data used in learning.

Since each of the speech recognition neural networks has learned to recognize the voice data of different voice patterns, the adaptation in speech recognition is variable from one speech recognition neural network to another.

The adaptation judgment data are fed from each of the speech recognition neural networks to the selector means wherein a speech recognition neural network having the highest adaptation in speech recognition will be selected. The result of selection is provided to the output control means which in turn outputs the result of speech recognition from the selected speech recognition neural network.

In such a manner, the voice data of different voice patterns can exactly be recognized by the speech recognition system of the present invention.

It is preferred that each of the speech recognition neural networks comprises a plurality of neurons in which an internal state value X is set and which are mutually connected. It is also preferred that each of said neurons is formed as an dynamic neuron, the internal value X being adapted to vary according to time for satisfying a function $X=G(X, Z_j)$ represented by the use of the internal state value X and input data $Z_j$ (j=0, 1, 2, . . . , n where n is a natural number) provided to that neuron.

To accomplish the other object, the present invention provides a speech recognition system comprising:

feature extracting means for cutting and transforming input voice data into a feature vector for each frame, said feature vectors being sequentially outputted from said feature extracting means;

voice recognizing and processing means including a plurality of speech recognition neural networks each learned to infer a feature vector of a speaker based on a feature vector of a speaker inputted from said feature extracting means into that speech recognition neural network for outputting that inferred vector as adaptation judgement data representing the adaption in the speech recognition, said each speech recognition neural network being formed to output said adaptation judgement data based on a feature vector actually inputted from said feature extracting means; and speaker recognizing means for computing the rate of coincidence between the adaptation judgment data from each of said speech recognition neural network means and the feature vector of the speaker actually inputted from said feature extracting means into said each speech recognition neural network to recognize the speaker of the inputted voice for each of said speech recognition neural network.

Such an arrangement can accurately recognize a plurality of speakers from the inputted voice data.

Each of the speech recognition neural networks comprises a plurality of neurons connected to one another in a predetermined manner and set to have an internal state value X, each of said neurons being formed as a dynamic neuron wherein the internal state value X is variable through the passage of time into such a value that satisfies a function $X=G(X, Z_j)$ represented by input data $Z_j$ (j=0, 1, 2, . . . , n; n is a natural number) and said internal state value X, each of said dynamic neurons being preferably adapted to output its internal state value X after it has been transferred into a value satisfying a function F (X).

Each of said speech recognition neural networks also comprises an input neuron for receiving said feature vector and an adaptation output neuron for outputting the adaptation judgment data, said adaptation output neuron being capable of being formed to infer a feature vector to be inputted and to output said inferred data as adaptation judgment data.

Thus, the data processing throughout the neural networks can be simplified while the precision in speech recognition can be improved.

BRIEF DESCRIPTION OF THE DRAWINGS

FIGS. 12A–12C are graphs illustrating the output of a voice recognizing and processing operation.

FIGS. 13A–13C are graphs illustrating the output of another voice recognizing and processing operation.

DETAILED DESCRIPTION OF THE PREFERRED EMBODIMENTS

The present invention will now be described in detail with reference to the accompanying drawings.

Figure 1:
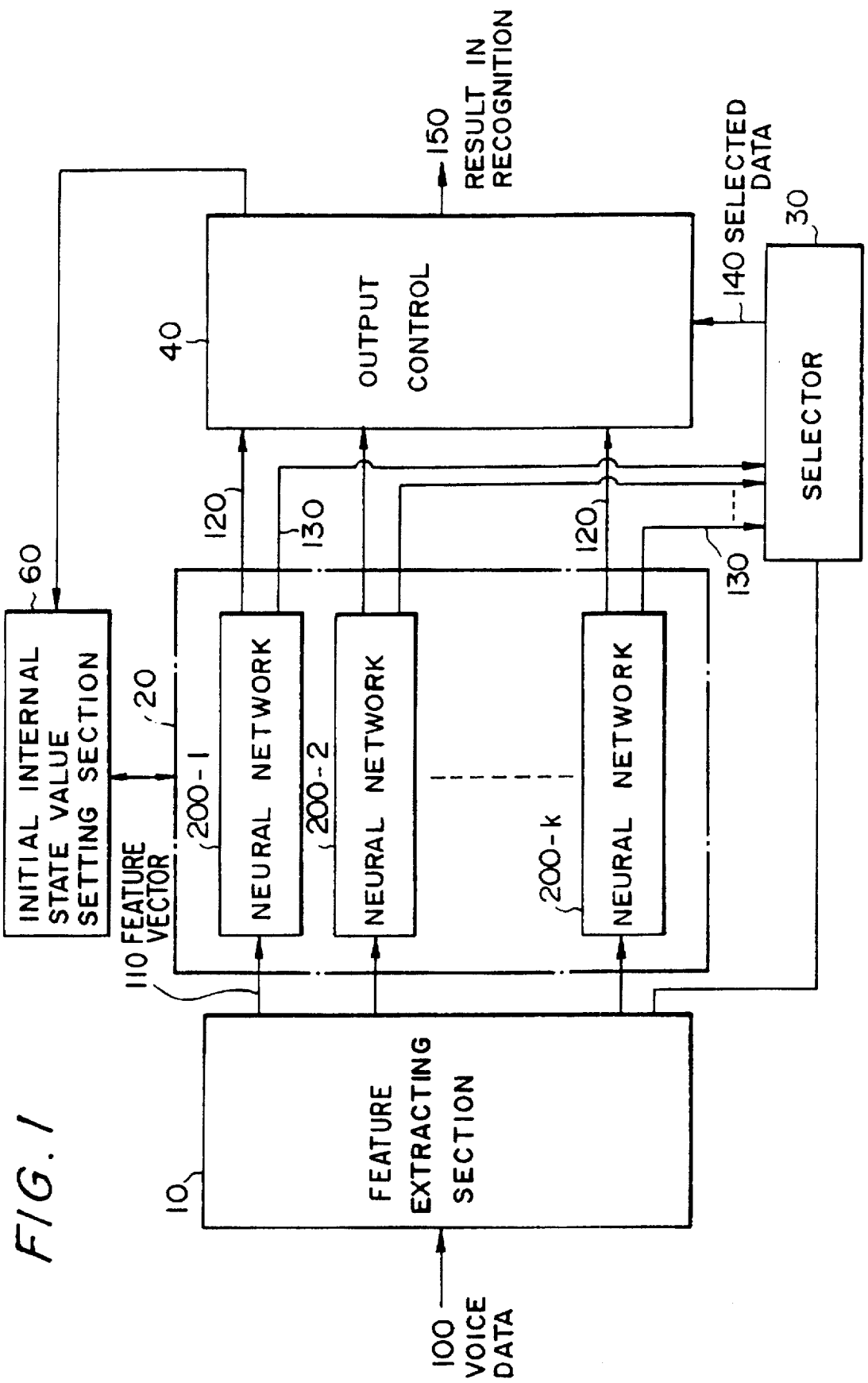
FIG. 1 is a block diagram of one embodiment of a speech recognition system constructed in accordance with the present invention.

Referring to FIG. 1, there is shown one preferred embodiment of a speech recognition system constructed in accordance with the present invention.

The General Arrangement of The Speech Recognition System

The speech recognition system comprises a feature extracting section 10, a voice recognizing and processing section 20, a selector section 30 and an output control section 40.

Figure 2:
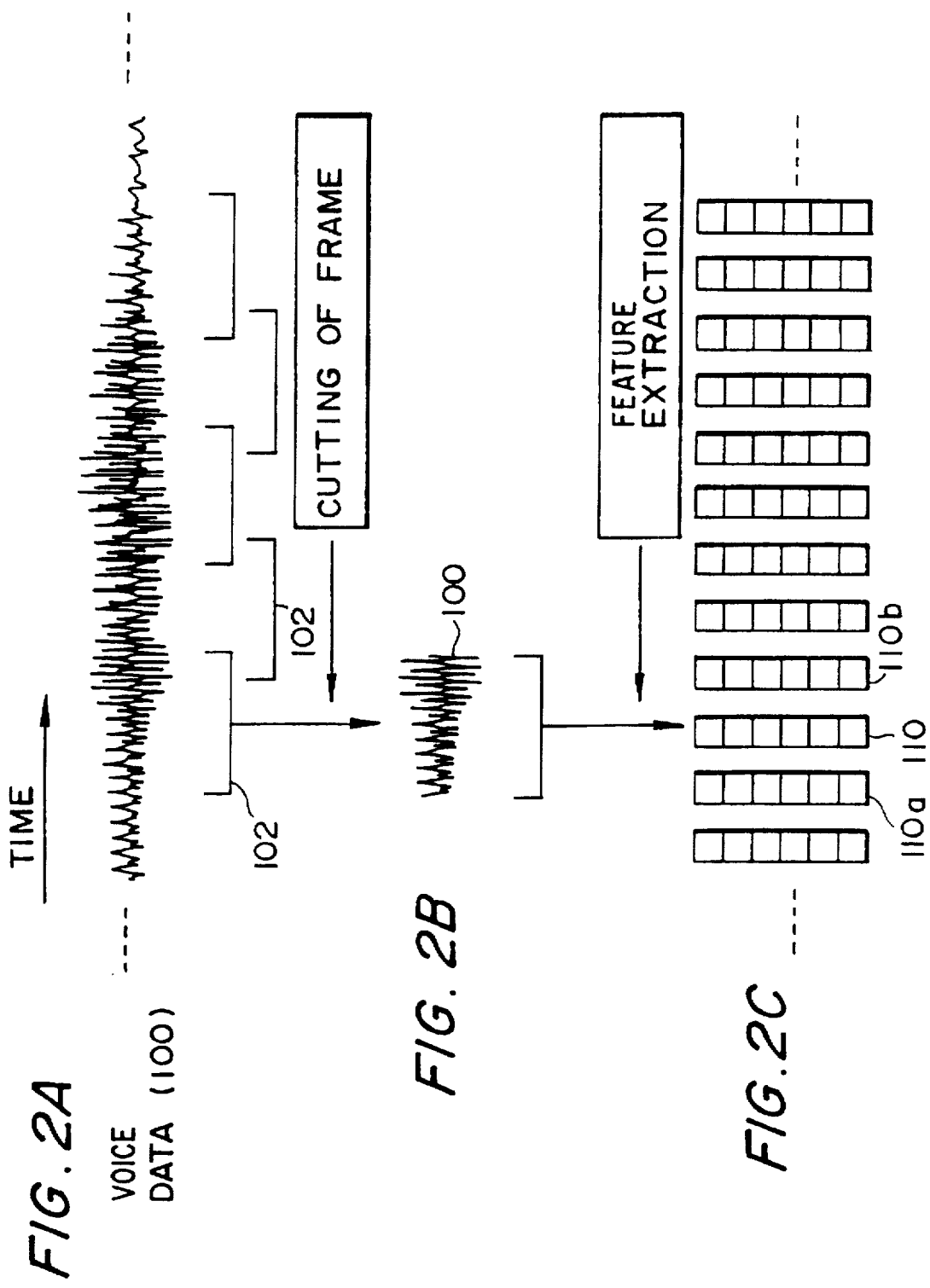
FIGS. 2A–2C are diagrams illustrating the transforming and processing operations in the feature extracting section of FIG. 1.

The feature extracting section 10 receives voice data 100 which, as shown in FIGS. 2A–2C, is cut and transformed into a feature vector 110 for each frame by the feature extracting section 10, the feature vector 110 being then fed to the voice recognizing and processing section 20. The feature vector 110 may be formed in the following manner: As shown in FIG. 2A, the voice data 100 is sequentially cut into each frame 102. The characteristics of each of the cut voice data parts is extracted through suitable means such as linear predictive analysis, filter bank, as shown in FIG. 2B. A train of feature vectors 110 thus formed are sequentially sent to the voice recognizing and processing section 20.

The voice recognizing and processing section 20 comprises a plurality of neural networks 200-1, 200-2, ... 200-k. The feature vectors 110 outputted from the feature extracting section 10 are received by the respective neural networks.

Each of the neural networks 200-1, 200-2, .... 200-k has learned one of voice patterns having different characteristics to recognize a particular voice data. Thus, each of the neural networks 200-1, 200-2, ... 200-k judges whether or not a voice data received by that neural network as a feature vector 110 is coincide with its own voice data to be recognized. The neural network further performs output of adaptation judgment data representing adaptation in recognition.

It is now assumed that a voice data "biiru (beer)" is to be recognized. As described, when this voice data "biiru (beer)" is spoken by different persons, the characteristics of their voice patterns are very different from one another. For example, the neural networks 200-1 and 200-2 have learned the voice patterns of two men having different characteristics to recognize their voice data of "biiru (beer)" while the neural network 200-k has learned the voice data of a woman to recognize her voice data of "biiru (beer)". Thus, each of the neural networks 200-1, 200-2 ... 200-k judges whether or not the voice data of "biiru (beer)" received by that neural network is coincide with the voice data learned by the same neural network, the result of recognition being then sent to the output control section 40. At the same time, each neural network 200-1, 200-2 ... 200-k computes data used to judge adaptation in speech recognition to generate adaptation judgment data 130 which in turn is sent to the selector section 30. The selector section 30 responds to adaptation judgment data 130 from each of the neural networks 200-1, 200-2 ... 20-k to form selection data 140 that represents a neural network having the highest adaptation in recognition. The selection data 140 is then sent to the output control section 40.

The adaptation judgement in recognition is judging adaptation 130 between a piece of input voice data and voice data learned by a neural network. More particularly, such a judgment is accomplished by causing each neural network to learn from voice data inputted thereinto so that preceding (or past) voice data inputted before said inputted voice data can be inferred. The adaptation in recognition depends on the rate of coincidence in inference. For example, a neural network 200 is caused to learn such that when a feature vector 110 is inputted in this neural network 200 as shown in FIGS. 2A–2C, another feature vector 110a inputted into the same neural network 200 immediately before said feature vector 110 can be inferred by the neural network 200.

The inferred feature vector is sent to the selector section 30 as adaptation judgment data 130. In other words, the relationship of time among input data reflects an individuality of a speaker. The easily predictable voice data of a speaker has a phoneme which is an individuality or characteristic similar to that used in learning that neural network.

The selector section 30 compares the adaptation judgment data 130 from each of the neural networks 200-1, 200-2 . . . 200-k (the inferred preceding feature vector) with a feature vector 110 actually provided from the feature extracting section 10 immediately before said adaptation judgment data to compute the rate of coincidence for each neural network. Since it is said that the result of the speech recognition in a neural network having the highest rate of coincidence (adaptation in recognition) is closest to the voice data to be recognized, this output may be taken as a proper result of recognition in the speech recognition system. The selection data 140 relating to the neural network having the highest adaptation in recognition is then supplied to the output control section 40.

The output control section 40 selects and outputs recognition data 120 in a neural network most congenial to the actual voice data and specified by the inputted selection data 140, as recognition result data 150.

In such a manner, the speech recognition system of the present invention can exactly recognize the voice data 100 from various speakers having different voice patterns, such as men and women or adults and children, without influence of the differences between the voice patterns.

As shown in FIGS. 2A–2C, each of the neural networks 200-1, 200-2 . . . 200-k can be formed to respond to the feature vector 110 inputted thereinto from the feature extracting section 10 to infer the inputted feature vector 110 itself or any one of feature vectors 110b to be inputted into that neural network after the feature vector 110. The inferred feature vector will then be sent to the selector section 30 as adaptation judgment data 130.

In such a case, similarly, the selector section 30 can compare a inferred feature vector from each of the neural networks 200-1, 200-2 . . . 200-k with an actual feature vector 110 inputted from the feature extracting section 10 as an object of comparison, the rate of coincidence from this comparison being then computed as adaptation in recognition for each neural network.

The neural networks 200 used in the present invention may be a conventional static neural network represented as by hierarchical or Marcov model. In order to perform better recognition by the use of a more simplified arrangement, they are preferably of an dynamic neural network type which will be described in detail.

Arrangement of Neural Speech Recognition Network

Figure 3:
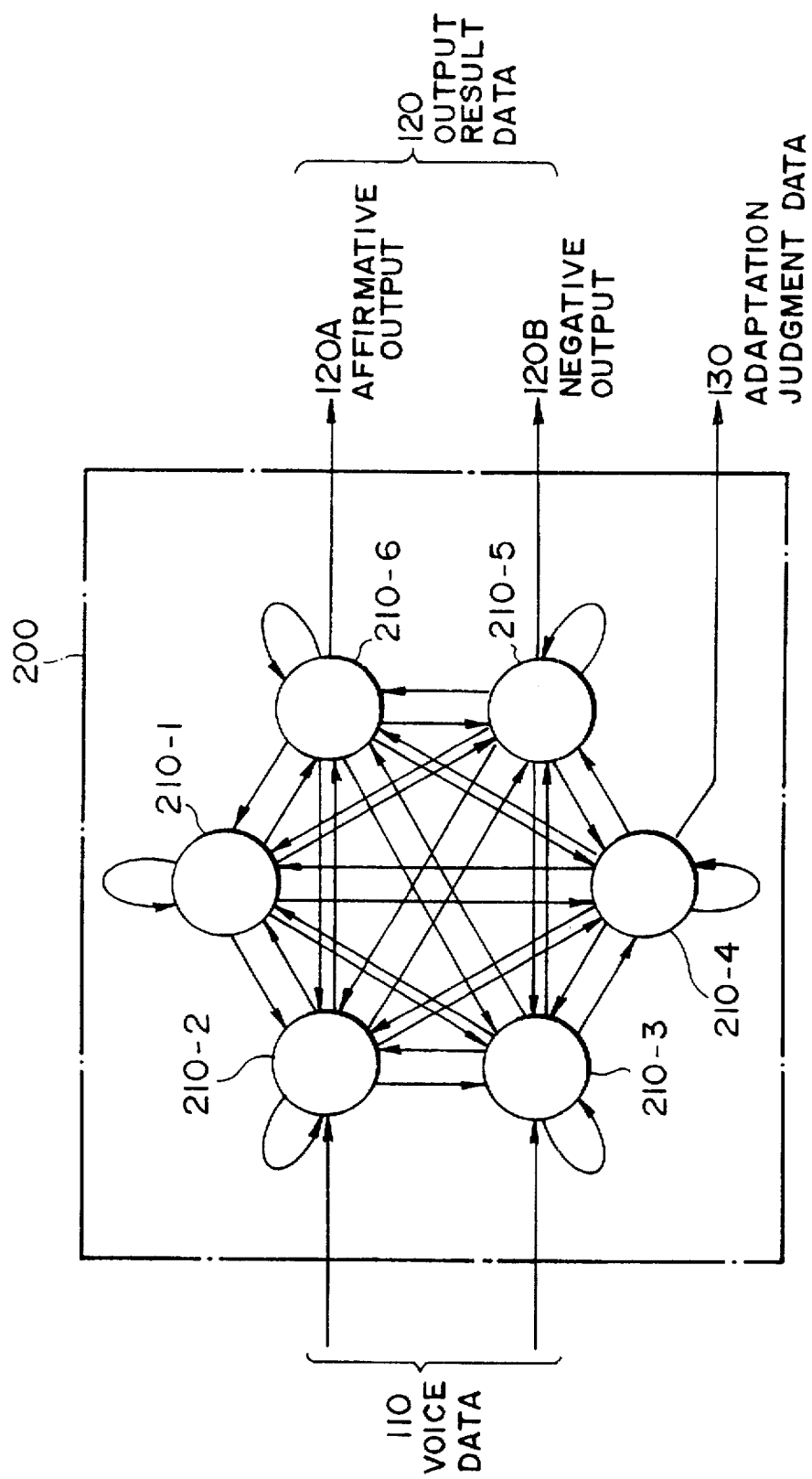
FIG. 3 is a diagrammatic view of a neutral network in the embodiment of FIGS. 1 and 2.

Referring now to FIG. 3, there is simply shown a dynamic neural network which can be used as one of the speech recognition neural networks 200. Such a neural network 200 comprises a plurality of neurons 210-1, 210-2 . . . 210-6 which are mutually connected to form a cell assembly. The joint between adjacent neurons 210 has a variable weight. When the variable weight is changed to a predetermined value by the learning, the exact speech recognition will be carried out.

The feature vector 110 of the voice data 100 is supplied to each of the neurons 210-2 and 210-3 while the recognition result data 150 is outputted from each of the neurons 210-5 and 210-6. The neuron 210-5 outputs a negative output 158-B while the neuron 210-6 outputs an affirmative output 158-A. Further, the neuron 210-4 outputs the adaptation judgment data 130.

Structure of Neuron

Figure 4:
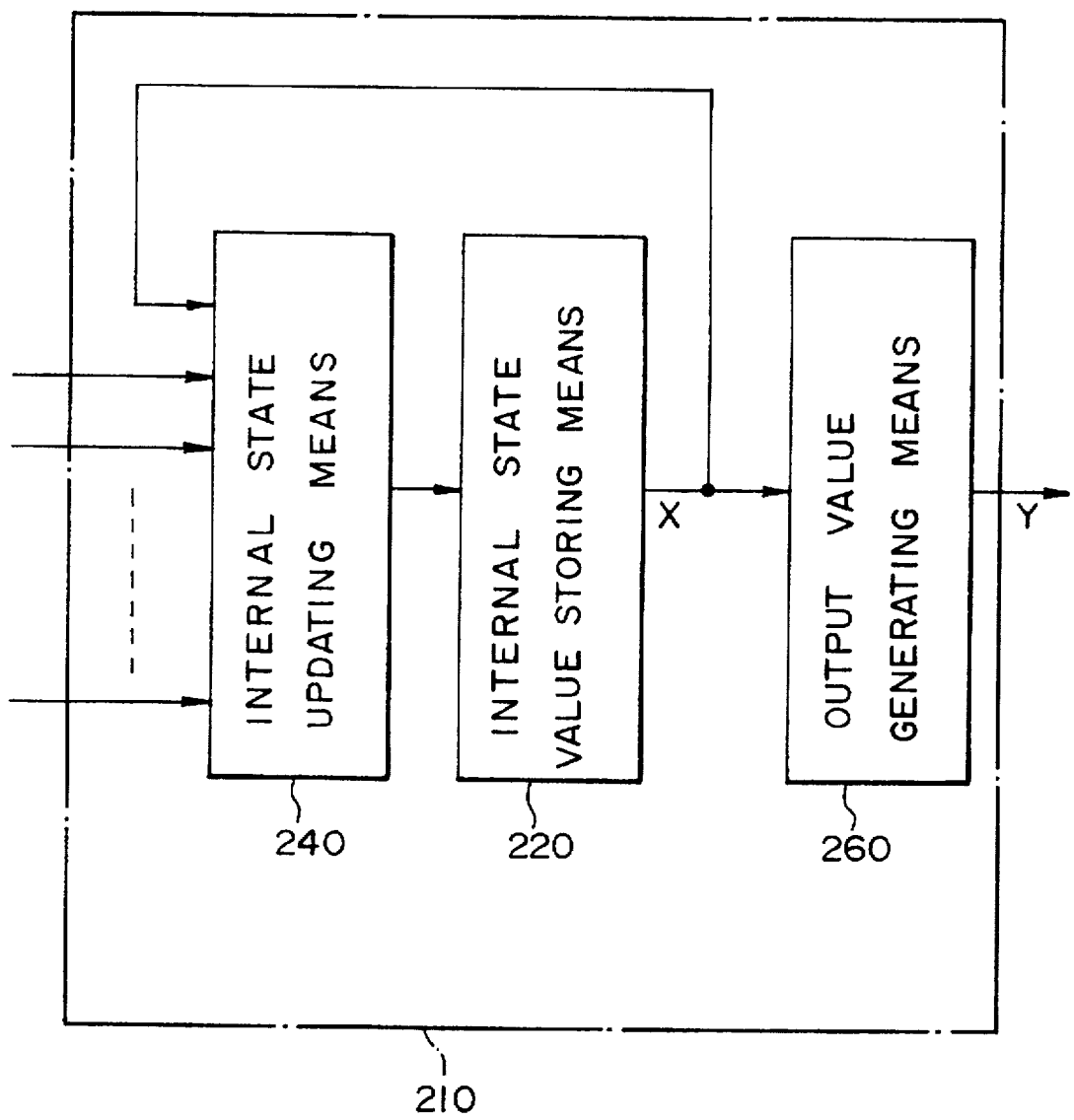
FIG. 4 is a diagrammatic view of one of neurons which define the neural networks.

FIG. 4 diagrammatically shows the structure of one neuron 210 as described. The neuron 210 comprises an internal state value storing means 220 for storing a given internal state value X, an internal state value updating means 240 for receiving the internal state value X and an external input value $Z_j$ described later to update the internal state value X in the internal state value storing means 220 and an output generating means 260 for transforming the internal state value X into an external output Y.

Thus, the neural network 200 used herein sequentially updates the internal state value X of the neuron 210 on basis of this internal state value itself. Therefore, the history of the data inputted into a neuron 210 will be stored as a succession of transformed internal state values X. In other words, the input history through time will be stored as the internal state value X and reflected to the output Y. In this mean, it can be said that the operation of the neuron 210 is dynamic. Unlike the conventional networks using the static neurons, therefore, the neural network 200 of the present invention can process time series data and have its circuitry reduced in whole scale, irrespectively of the neural network structure and others.

Figure 5:
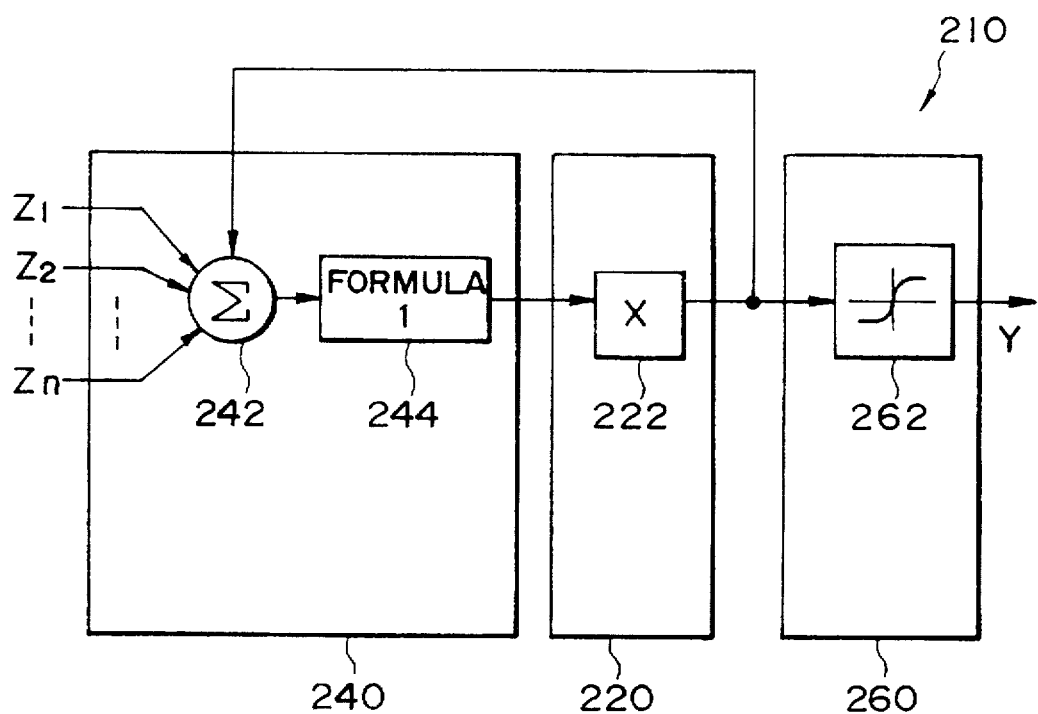
FIG. 5 is a view illustrating the details of the neuron shown in FIG. 4.

FIG. 5 illustrates the details of the neuron 210. The internal state value storing means 220 comprises a memory 222 for storing the internal state value X. The internal state value updating means 240 comprises means for integrating the inputs $Z_j$ and a computing section 244 for performing a computation represented by the following formula to determine a new internal state value X and to update the contents of the memory 222.

$$\tau \frac{d}{dt} X = -X + \sum_{j=1}^{n} Z_j \qquad \text{(Formula 9)}$$

The output generating means 260 comprises a computing section 262 for transforming the internal state value X stored in the memory 222 into an output value Y limited in range through sigmoid (logistic) function or the like.

On changes of the internal state value X and output value Y through time, it is assumed that the present internal state value is $X_{curr}$, the updated internal state value is $X_{next}$ and the external input value in this updating step is $Z_j$ (where j ranges between zero and n: n is the number of external inputs to the neuron 210). At this time, the operation of the internal state updating means 240 can be expressed by the function G:

$$X_{next} = G(X_{curr}, Z1 \ldots Zi \ldots Zn).$$

Various concrete forms of this expression can be considered. For example, the aforementioned formula 9 using a first-order differential equation can be used herein. In the formula 9, $\tau$ is a constant.

The formula 9 may slightly be modified to form the following formula 10.

$$\tau \frac{d}{dt} X_i = -X_i + \sum_{j=1}^{n} W_{ij} Y_j + D_i + \theta_i \qquad \text{(Formula 10)}$$

where $W_{ij}$ is a strength in connecting the output of the j-th neuron to the input of the i-th neuron; $D_i$ is an external input value; and $\theta$ is a biasing value. The biasing value can be included in the value $W_{ij}$ after it has been joined with a fixed value.

If the internal state of a neuron 210 is X at a moment in such a situation and when the operation of the output generating means 260 is expressed by the function F, the output Y of the neuron 210 can be expressed to be:

$$Y = F(X)$$

The concrete form of F is considered to be a sigmoid (logistic) function that is symmetrical in sign as shown by the formula 11 or the like.

$$Y = \frac{2}{1 + \exp(-X)} - 1 \qquad \text{(Formula 11)}$$

However, such functions can be replaced by any one of simple linear conversions, threshold function and others.

Figure 6:
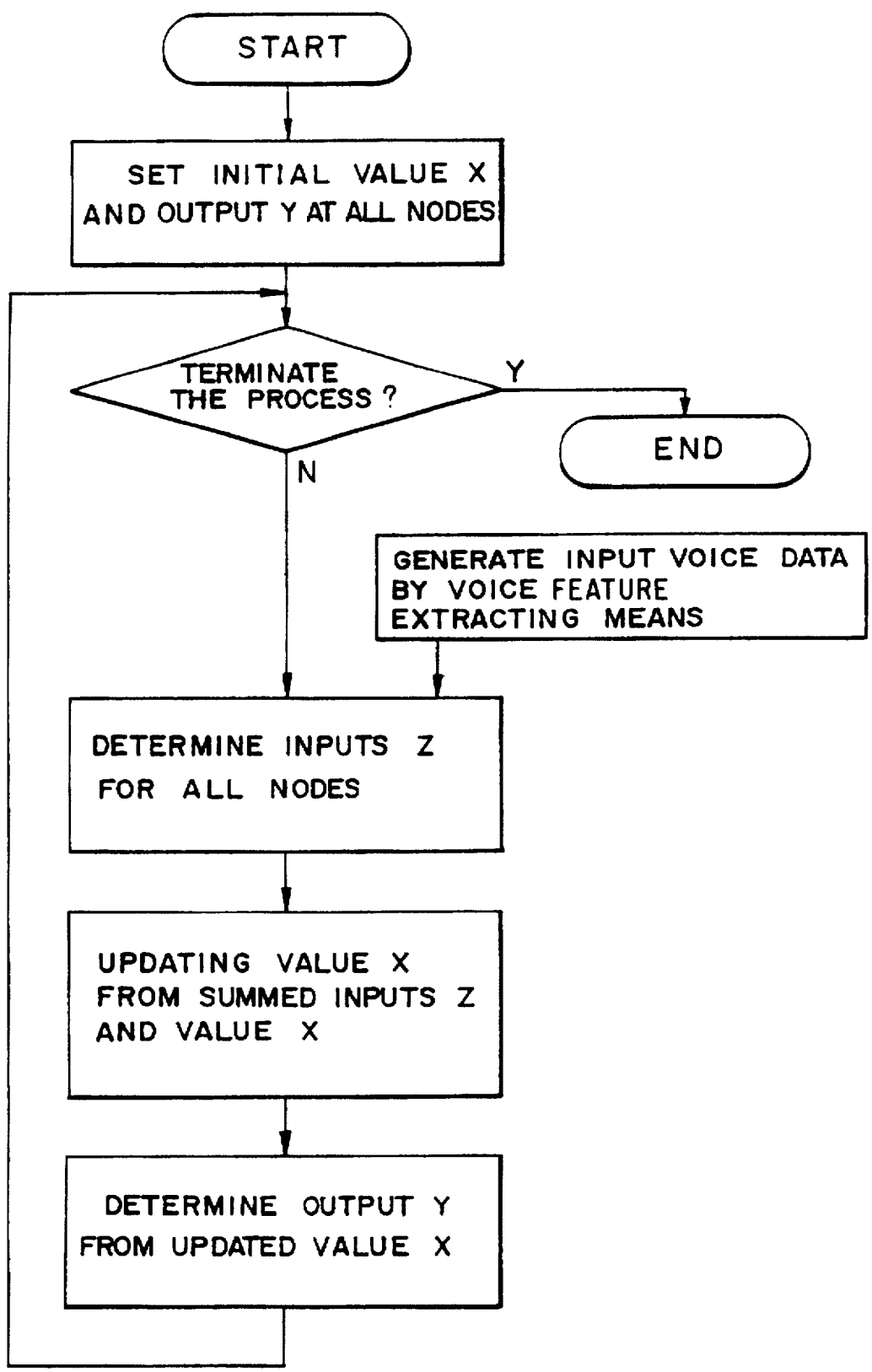
FIG. 6 is a flowchart illustrating the operation of the neuron in the embodiment of the present invention.

By using such a computing formula, the time series of the output Y from the dynamic neuron 320 of the present embodiment can be computed through such a process as shown in FIG. 6. In FIG. 6, the neuron is illustrated simply as a node for convenience.

The input $Z_j$ to the neuron 210 may be of any form including the output of the neuron itself multiplied by a weight, the output of any other neuron multiplied by a coupling weight or any external input other than that of the neural network.

In this embodiment, as shown in FIG. 3, each of the neurons 210-2 and 210-3 receives its own weighted output, the weighted output of any other neuron and the output 110 of the feature extracting section 10. The neuron 210-1 receives its own weighted output and the weighted output of any other neuron. Each of the neurons 210-4, 210-5 and 210-6 receives its own weighted output and the weighted output of any other neuron. The output of the neuron 210-4 is sent to the selector section 30. The outputs of the neurons 210-5 and 210-6 are provided to the output control section 40.

Setting of Initial Internal State Value

In the present embodiment, each of the neurons 210 is adapted to progressively update the internal state value X stored in the internal state storing means 220 through the internal state updating means 240. Therefore, when a neural network 200 is defined by such neurons 210, it is required that the neurons are initialized prior to the start of the network.

To this end, the speech recognition system of the present embodiment is provided with an initial internal state value setting section 60 which is adapted to provide preselected initial values to all the neurons prior to start of the neural network 200. More particularly, before the neural network 200 is started, initial internal state values X suitably selected are set in all the neurons 210 and the corresponding outputs Y are set similarly. Thus, the neural network can promptly be started.

Learning of the Neural Network

A process of causing the neural network 200 to learn the speech recognizing and processing operation will be described.

Figure 7:
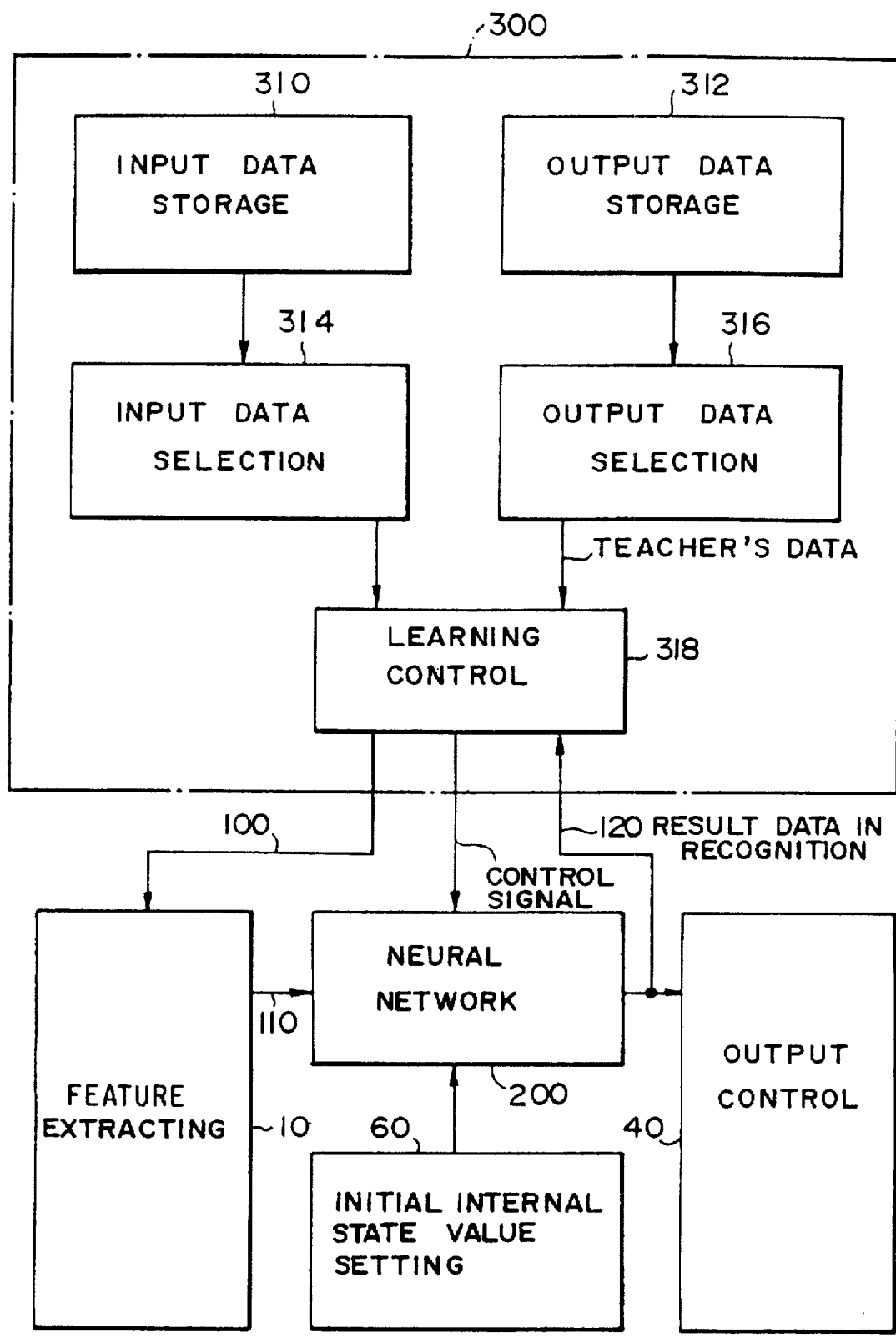
FIG. 7 is a schematic diagram of a learning device for the neural network section in the embodiment of the present invention.
Figure 8A:
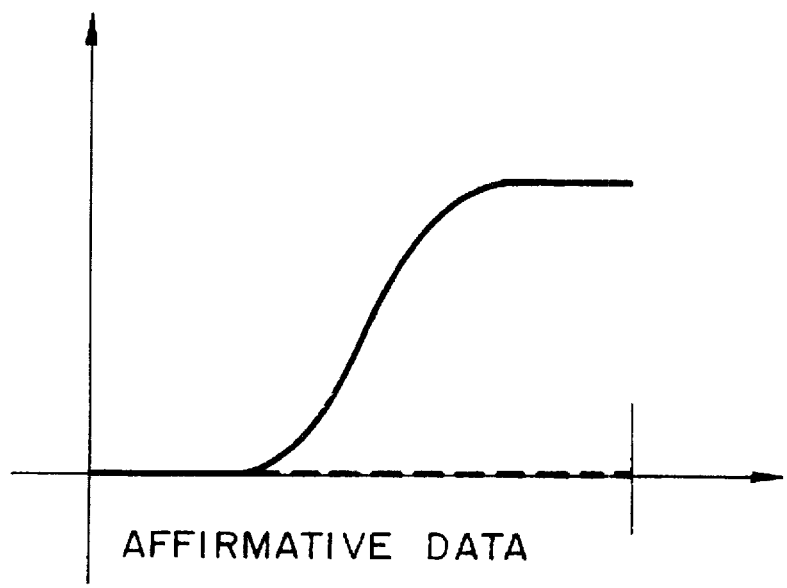
FIGS. 8A–8B are views illustrating a learning process.
Figure 8B:
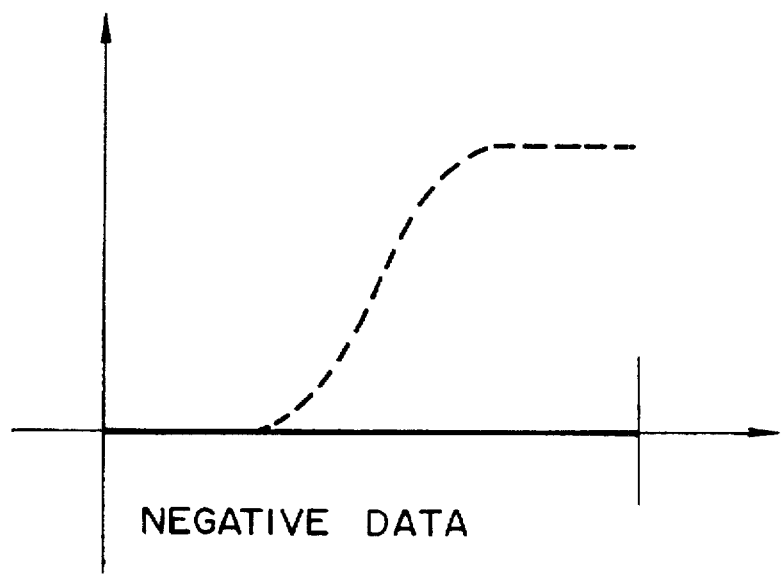

FIG. 7 shows a learning device 300 for causing the neural network 200 to learn the speech recognizing and processing operation. The learning device 300 is adapted to cause the neural networks 200-1, 200-2 . . . 200-k to learn voice patterns having different characteristics.

The learning device 300 comprises an input data storing section 310 in which learning input voice data have been stored, an output data storing section 312 in which output data used as patterns corresponding to the input voice data have been stored, an input data selecting section 314 for selecting an input data to be learned, an output data selecting section 316 for selecting an output data, and a learning control section 318 for controlling the learning of each neural network 200.

When it is to start the learning process in the learning device 300, initial state values X are set at all the neurons 210 in a neural network 200 to learn. A voice data to be learned is then selected by the input data selecting section 310 and inputted into the learning control section 318. At this time, a learning output data corresponding the selected learning input data is selected by the output data selecting section 316 and inputted into the learning control section 318. The selected learning input voice data is inputted into the voice extracting section 10 wherein a feature vector 110 is extracted and sent to that neural network 200 as an external input. The inputs $Z_j$ to all the neurons 210 are summed and the internal state value X in each neuron 210 is updated. The output Y of the corresponding neuron 201 is determined from the updated value X.

In the initial state, the coupling strength between each pair of adjacent neurons is randomly provided in the neural network 200. The recognition results 120B and 120A outputted from the neurons 210-5 and 210-6 shown in FIG. 3 are random. The weight between the pair of adjacent neurons is slightly changed to make these outputs to be corrected.

When a voice data to be recognized is inputted into a neural network 200 to be learned, the neural network 200 learns that it should output a high level signal representing an affirmative output 120A through the neuron 210-6 and a low level signal representing a negative output 120B through the neuron 210-5. This improves the precision in the speech recognition.

Different voice data 100 to be recognized are repeatedly inputted into the neural network 200 such that the weight between each pair of adjacent neurons will slightly be changed. The outputs of the neurons 210-5 and 210-6 gradually approach proper values. If the inputted voice data is not wanted to be learned by the neural network, the weight between each pair of adjacent neurons is changed so that the affirmative and negative outputs 120A, 120B become low and high levels, respectively.

The number of learnings repeatedly performed until the output of the neural network 200 converges is about several thousands times.

Figure 9A:
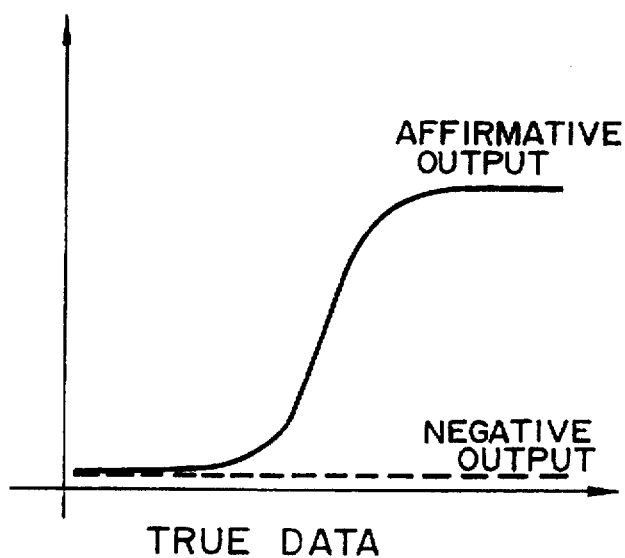
FIGS. 9A–9B are views illustrating another learning process.
Figure 9B:
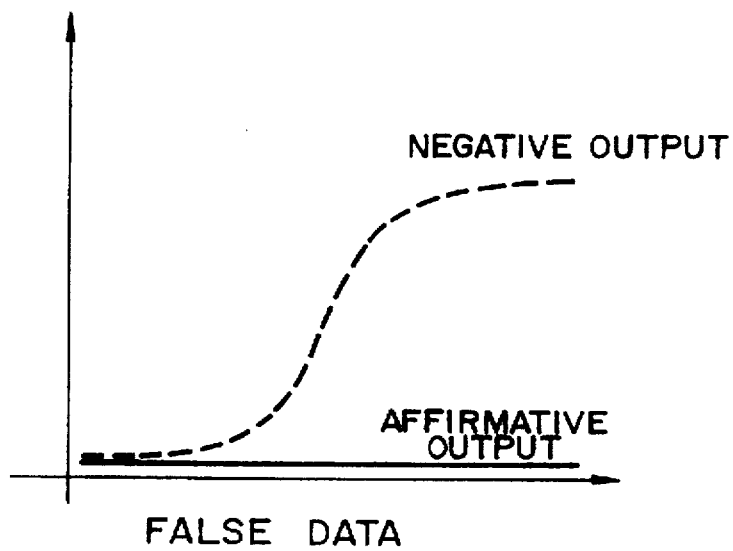

Such a learning process may be replaced by another learning process of successively inputting two different voice data into the same neural network. This is because in the process of learning one voice data at a time, the affirmative output once reached high level cannot be lowered to low level while the negative output once reached low level cannot be raised to high level. More particularly, when one voice data is used at a time, a voice data to be recognized (hereinafter called "true data") is provided to the neural network to learn that it can raise the affirmative output to high level while maintaining the negative output low level, as shown in FIG. 9A. On the other hand, a voice data not to be recognized (hereinafter called "false data") is provided to the neural network to learn that it can raise the negative output high level while maintaining the affirmative output low level, as shown in FIG. 9B. Such a learning process has a problem in that once the affirmative and negative outputs have raised to high level, they will not be lowered to low level.

Therefore, when a plurality of voice data including true and false data are continuously inputted into the neural network, the affirmative output is at once raised to high level by input of a true data and will not be lowered to low level even if a false data is thereafter inputted into the neural network. This is also true of the negative output.

Figure 10A:
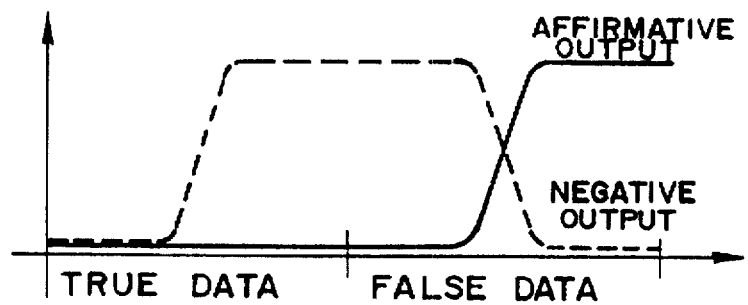
FIGS. 10A–10D are views illustrating a further learning process.
Figure 10B:
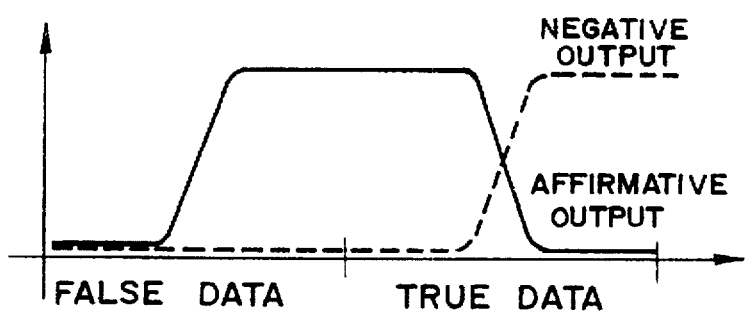
Figure 10C:
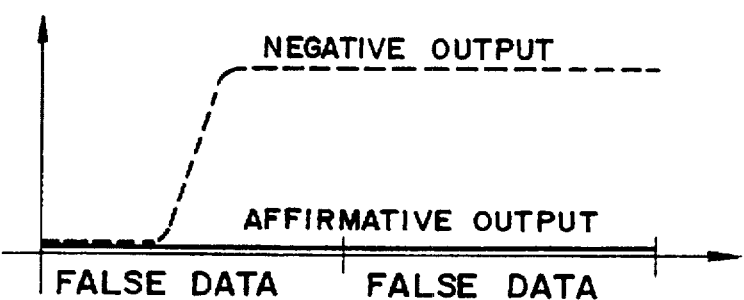
Figure 10D:
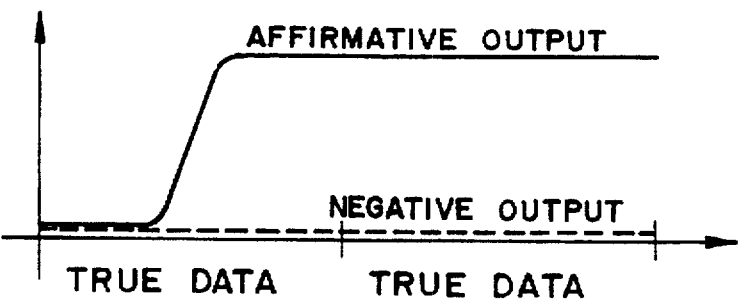

Accordingly, the present embodiment of the present invention takes a process of successively inputting two voice data into a neural network to learn both the raising and lowering of its output, as shown in FIGS. 10A–10D. In FIG. 10A, the neural network is repeatedly caused to learn by successively inputting true and false data thereinto. Thus, the neural network can learn the raising of the affirmative output and the raising and lowering of the negative output. In FIG. 10B, the neural network is repeatedly caused to learn by successively inputting false and true data thereinto. Thus, the neural network can learn the raising and lowering of the affirmative output and the raising of the negative output. In FIG. 10C, the neural network is repeatedly caused to learn by successively inputting false data thereinto. Thus, this learning step is not to make the neural network 200 have a wrong recognition that a data next to the false data is true, from the learning step of FIG. 10B. In FIG. 10D, the similar learning step is carried out by successively inputting two true data into the neural network. The learning step of FIG. 10D is not to make the neural network 200 have a wrong recognition that a data next to the true data is false, from the learning step of FIG. 10A.

Such a learning process is executed to the respective neural networks 200-1, 200-2 . . . 200-k shown in FIG. 1 with voice patterns having different characteristics. For example, if it is wanted to learn the neural networks 200-1, 200-2 . . . 200-k with respect to recognition of a voice data "biiru (beer)", each of the neural networks 200-1, 200-2 . . . 200-k is caused to learn voice data "biiru (beer)" having different voice patterns through the aforementioned learning process. As a result, each of the neural networks will have an input voice pattern set to meet a recognition that should be performed by that neural network. Consequently, each of the neural networks will have a different rate of recognition to the same voice data 100 of "biiru (beer)". For example, if the neural network 200-1 has learned the voice data of a man while the neural network 200-2 has learned the voice data of a woman and when the speech recognition system receives the voice data of another man, the neural network 200-1 can recognize the voice data with an increased probability, but the neural network 200-2 cannot substantially recognize the voice data. On the contrary, when the speech recognition system receives the voice data of another woman, the rate of recognition increases in the neural network 200-2, but decreases in the neural network 200-1.

Since the neural networks 200-1, 200-2 . . . 200-k respectively learn voices having different characteristics in the present embodiment, each of the neural networks will provide a different result in speech recognition 120 even if it receives the same voice vector 110 from the feature extracting section 10.

In the present embodiment, each of the neural networks 200-1, 200-2 . . . 200-k is adapted to output adaptation judgment data 130 for the voice data such that a result of recognition having the highest rate of recognition can be selected from a plurality of recognition results 120 from the neural networks 200-1, 200-2 . . . 200-k.

As described, the judgment of the adaptation in recognition is to judge adaptation 130 between input voice data and voice data learned by a neural network. More particularly, such a judgment is accomplished by causing each neural network to learn so that the preceding voice data inputted before the preceding voice data has been inputted can be inferred. The adaptation in recognition depends on the rate of coincidence in the inference.

For example, a neural network 200 is caused to learn such that when a feature vector 110 is inputted in this neural network 200 as shown in FIGS. 2A-2C, the preceding (or past) feature vector 110a inputted into the same neural network 200 immediately before said feature vector 110 can be inferred by the neural network 200. The inferred feature vector is sent to the selector section 30 as adaptation judgment data 130. In other words, the relationship of time between the input data reflects the individuality of the speaker. The easily predictable voice data of a speaker has a phoneme which is an individuality or characteristic similar to that used in learning that neural network.

The selector section 30 compares the adaptation judgment data 130 from each of the neural networks 200-1, 200-2 . . . 200-k (the inferred preceding feature vector) with a feature vector 110 actually provided from the feature extracting section 10 immediately before the adaptation judgment data 130 to compute the rate of coincidence for each neural network. Since it is said that the result of the speech recognition in a neural network having the highest rate of coincidence (adaptation in recognition) is closest to the voice data to be recognized, this output is taken as a proper result of recognition in the speech recognition system.

This process of learning the judgment of adaptation in recognition is carried out simultaneously with the aforementioned process of learning the speech recognition. More particularly, the neural network 200 can be caused to learn learning voice data such that the adaptation outputting neuron 210-4, which is one of the neurons defining a neural network 200 infers past feature vectors precedingly inputted from the neurons 210-2 and 210-3 thereinto and outputs these inferred feature vectors from the neuron 210-4 as adaptation judgment data 130.

The judgment of adaptation in recognition can be carried out on the predictive data of a feature vector 110 itself being inputted or the predictive data of a future feature vector 110b which will be inputted, as shown in FIGS. 2A-2C, rather than the inference of the previously inputted data. However, experiments showed that the inference of past feature vectors provided higher accuracy in recognition.

Speech Recognition Processing

Figure 11:
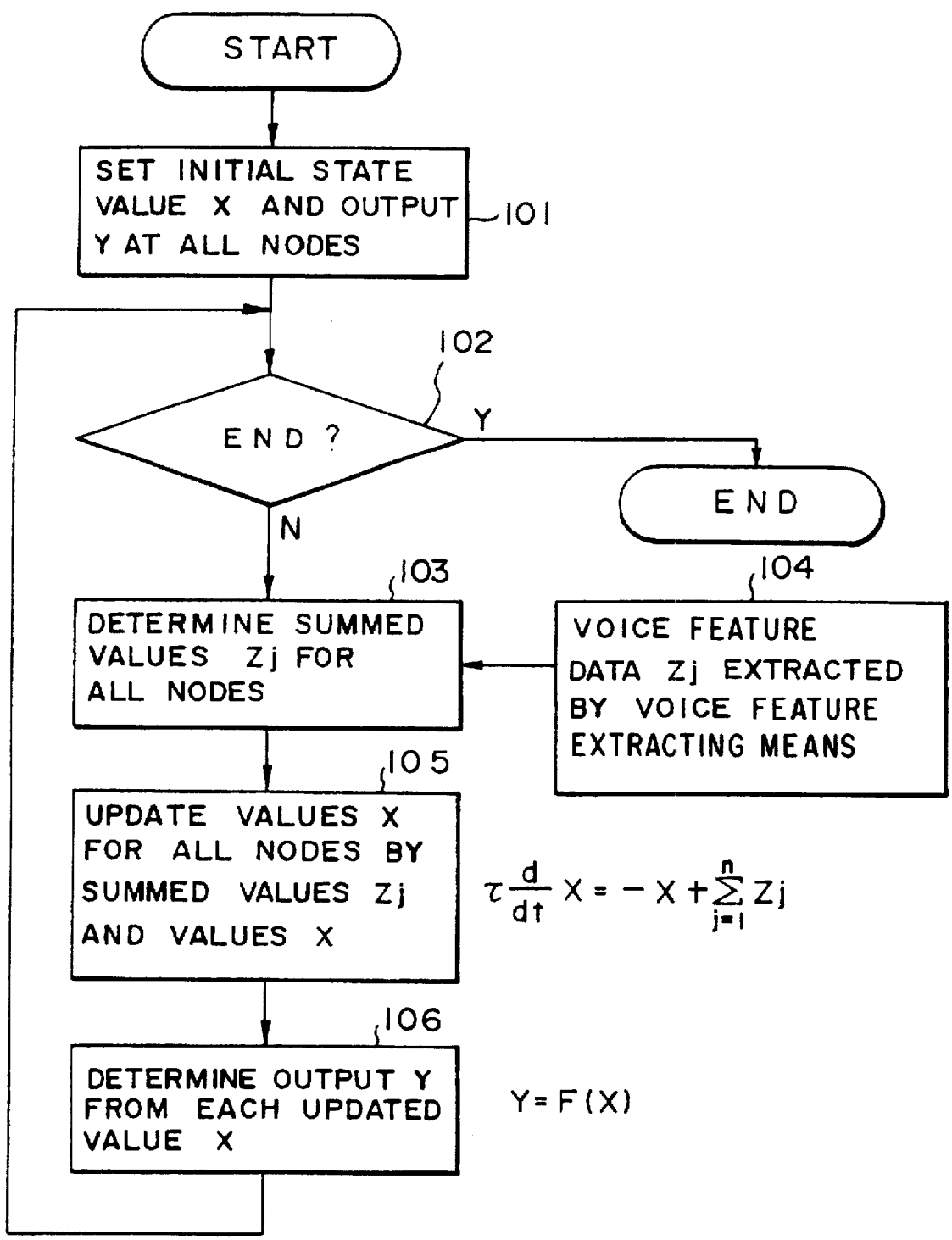
FIG. 11 is a flowchart illustrating the voice recognizing and processing operation.

The speech recognition performed by the aforementioned neural network 200 will be described in brief according to a flowchart shown in FIG. 11.

As the speech recognition is started, an initial internal state value X suitably selected and an output Y corresponding to the initial internal state value are first set in all the neurons 210-1, 210-2 . . . 210-6 (step 101).

Subsequently, the sum of the aforementioned input data $Z_j$ to all the neurons is determined (steps 104 and 103).

The internal state value X in each of the neurons is then updated by the sum of $Z_j$ determined at the step 103 (step 105). The output value from each of the neurons is computed from the respective updated value X (step 106). Thereafter, the process is returned to the step 102 and terminated if it receives a command of termination.

The recognition result of the neural network 200 is provided as outputs of the neurons 210-5 and 210-6. The adaptation judgment output 130 is provided as output of the neuron 210-4.

FIGS. 12A-12C, 13A-C and 14A-C show data in experiments that a speech recognition system constructed according to the illustrated embodiment of the present invention was actually used. In these experiments, the speech recognition system comprised two neural networks 200-1 and 200-2, each of which was consisted of 20 input neurons, two output neurons and 32 other neurons. When 20-order LPC cepstrum was given from the feature extracting section 10 to each of the neural networks 200-1 and 200-2, their output data were measured.

Figures 14A, 14B, 14C:
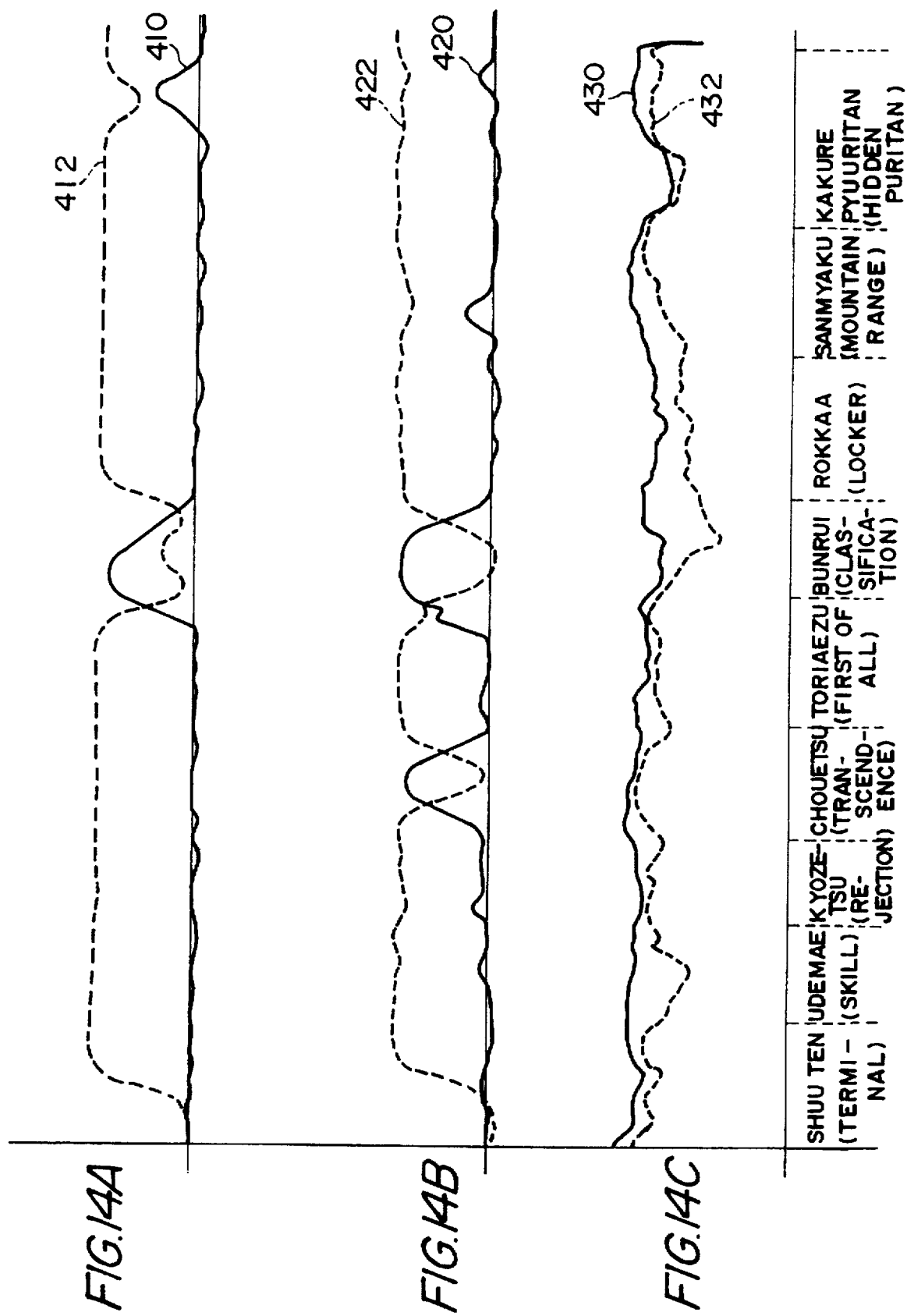
FIGS. 14A–14C are graphs illustrating the output of still another voice recognizing and processing operation.

FIGS. 12A, 13A and 14A show affirmative and negative outputs 410, 412 from one of the neural networks 200-1. FIGS. 12B, 13B and 14B show affirmative and negative outputs 420, 422 from the other neural network 200-2. FIGS. 12C, 13C and 14C show adaptation 430 between input voice data and the neural network 200-1 and adaptation 432 between input voice data and the neural network 200-2.

In the experiments, there were two speakers A and B having different phonemes. One of the neural networks 200-1 learned the voice of the speaker A while the other neural network 200-2 learned the voice of the speaker B. Each of the neural networks 200-1 and 200-2 is given an affirmative term to be recognized, "toriaezu (first of all)" and eight negative terms to be recognized, "shuuten (terminal)", "udemae (skill)", "kyozetsu (rejection)", "chouetsu (transcendence)", "bunrui (classification)", "rokkaa (locker) ", "sanmyaku (mountain range)" and "kakure pyuuritan (hidden Puritan)". Each of the neural networks 200-1 and 200-2 had learned, with the voices of the speakers A and B, to change the affirmative and negative outputs when the affirmative term is given thereto and as the half of this affirmative term has been recognized. In FIGS. 12A-12C, 13A-13C and 14A-14C, the ordinate axis represents outputs of the output neuron while the abscissa axis represents the passage of time from left to right.

Experimental data shown in FIGS. 12A-12C are when the voice data of the speaker A were recognized by the speech recognition system that had learned in such a manner. As will be apparent from FIG. 12A, the neural network 200-1 learned with the voice of the speaker A has an increased affirmative output 410 and a decreased negative output 412 when the term "toriaezu (first of all)" is inputted thereinto. On the other hand, the affirmative and negative outputs 420 and 421 of the other neural network 200-2 learned with the voice of the other speaker B are not changed by the term "toriaezu (first of all)" inputted thereinto. This means that the neural network 200-1 accurately recognizes the term "toriaezu (first of all)" and the other neural network 200-2 does not recognize this term. This is proven by FIG. 12C that shows the judgment of adaptation in recognition. The adaptation 430 of the neural network 200-1 is always larger than the adaptation 432 of the other neural network 200-2.

From the foregoing, it will be understood that if the recognition result of the neural network 200-1 is taken based on its judgment of adaptation in recognition, the affirmative and negative outputs properly recognizing the term "toriaezu (first of all)" are provided.

FIGS. 13A-13C show data when the speech recognition system of the present embodiment was caused to recognize the voice data of the other speaker B.

As shown in FIG. 13A, the neural network 200-1, which had learned with the voice data of the speaker A, cannot exactly recognize the term "toriaezu (first of all)" inputted thereinto by the speaker B. On the contrary, the other neural network 200-2, which had learned with the voice of the speaker B, can properly recognize the term "toriaezu (first of all)" inputted thereinto by the speaker B. This is proven by the graph of FIG. 13C that shows the judgment of adaptation in recognition.

If the recognition result of the neural network 200-2 is taken based on the judgment of adaptation in recognition in the selector section 30, the output representing the proper recognition will be obtained.

FIGS. 14A–14C show data when the same process as in FIGS. 12A–12C and 13A–13C is carried out with the voice data of a speaker C having a tone different from those of the speakers A and B.

As will be apparent from FIGS. 14A and 14B, the neural network 200-1 can properly recognize the term "toriaezu (first of all)" contained in the voice data of the speaker C. On the contrary, the neural network 200-2 exactly recognizes the term "toriaezu (first of all)", but wrongly recognizes the other term "kyozetsu (rejection)" as the term "toriaezu (first of all)". This is apparent from the graph of FIG. 14C that shows the judgment of adaptation in recognition. Also in such a case, if the recognition result of the neural network 200-2 is taken based on the judgment of adaptation in recognition in the selector section 30, the output representing the proper recognition will be obtained.

Figure 15:
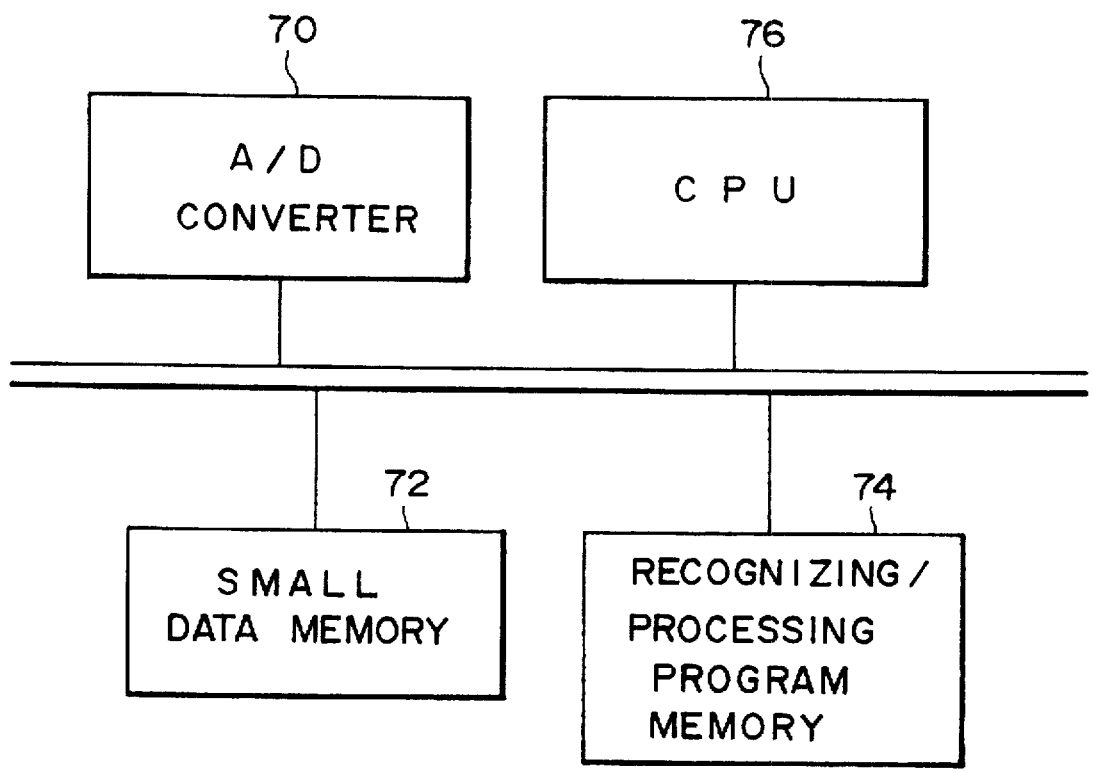
FIG. 15 is a view showing a hardware usable in the present invention.

FIG. 15 shows a hardware usable in the speech recognition system of the present embodiment. The hardware comprises an analog/digital converter 70 functioning as the feature extracting section 10; a data memory 72 that has stored various data including the internal state value X of the neural network 200; a CPU 76; and a recognizing program memory 74 that has stored a processing program for causing the CPU 76 to function as the selector 30 or output controller 40.

Other Embodiments

The present invention is not limited to the aforementioned embodiment, but may be carried out in various modifications without departing from the spirit and scope of the invention.

For example, the neurons 210 of FIG. 5 used in constructing the neural network 200 may be replaced by any other type of neuron.

Figure 16:
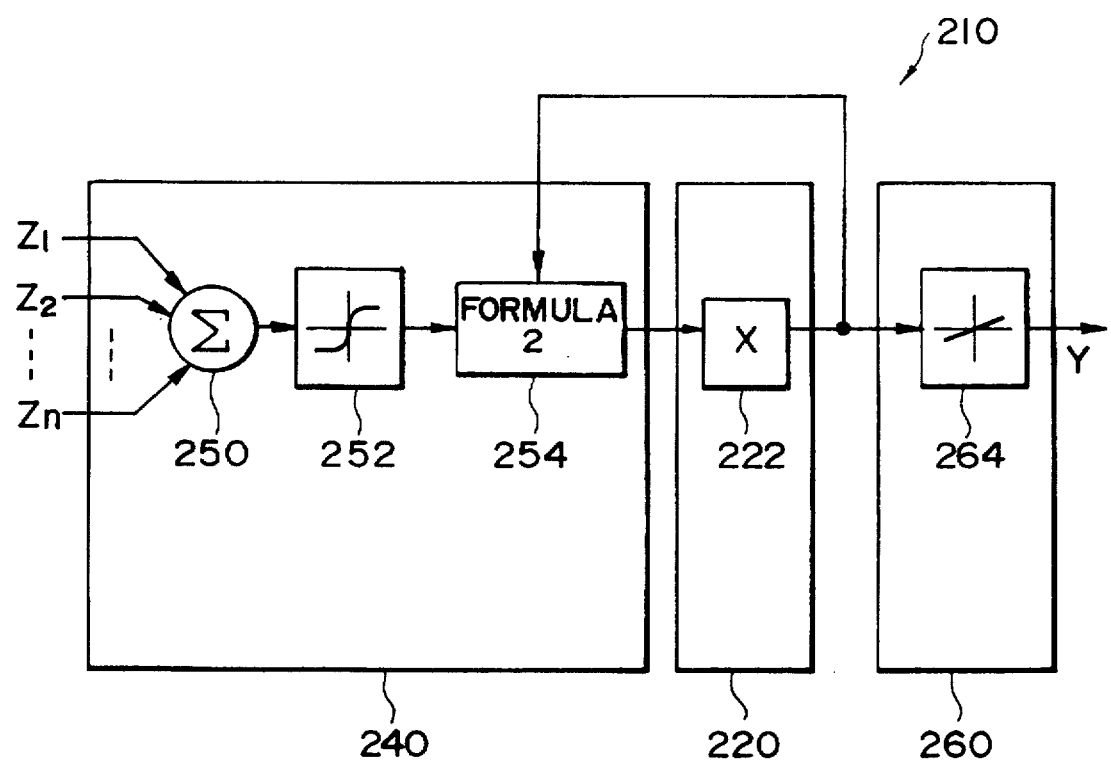
FIG. 16 is a view illustrating another embodiment of an dynamic neuron usable in the present invention.

FIG. 16 shows another dynamic neuron 210 usable in the neural network 200 of the present invention. This dynamic neuron 210 comprises a internal state updating means 240 which comprises an integrator section 250, a function transforming section 252 and a computing section 254. The internal state updating means 240 is adapted to update the internal state value X of the memory 222 through the following formula:

$$\tau \frac{d}{dt} X = -X + S \left( \sum_{j=1}^{n} Z_j \right) \quad \text{(Formula 12)}$$

More particularly, the integrator section 250 integrates the inputs $Z_j$ and the function transforming section 252 transforms the integrated value through the sigmoid (logistic) function S. The computing section 254 determines a new internal state value X from the function transformed value and the internal state value X of the memory 222 through the formula 12, the new internal state value X being used to update the value of the memory 222.

More concretely, the computation may be performed by the following formula:

$$\tau \frac{d}{dt} X_i = -X_i + S \left( \sum_{j=1}^{n} W_{ij} Y_j + D_i + \theta_i \right) \quad \text{(Formula 13)}$$

where $W_{ij}$ is a strength in connecting the output of the j-th neuron to the input of the i-th neuron; $D_i$ is an external input value; and $\theta_i$ is a biasing value. The biasing value may be included in the value $W_{ij}$ after it has been joined with a fixed value. The concrete form of the range limiting function S may be a sign-symmetrical sigmoid function or the like.

The output generating means 260 may be the form of a mapping function computing section 264 for transforming the internal state value X into an output value Y multiplied by a constant.

Although the embodiments of the present invention have been described as to the recognition of words and terms as voice data, the present invention may be applied to various other recognitions of phoneme, syllable or the like.

Although the present invention has been described as to the recognition of voice data itself inputted, it is not limited to such a case, but may be applied to a speaker recognition from voice data inputted.

Figure 17:
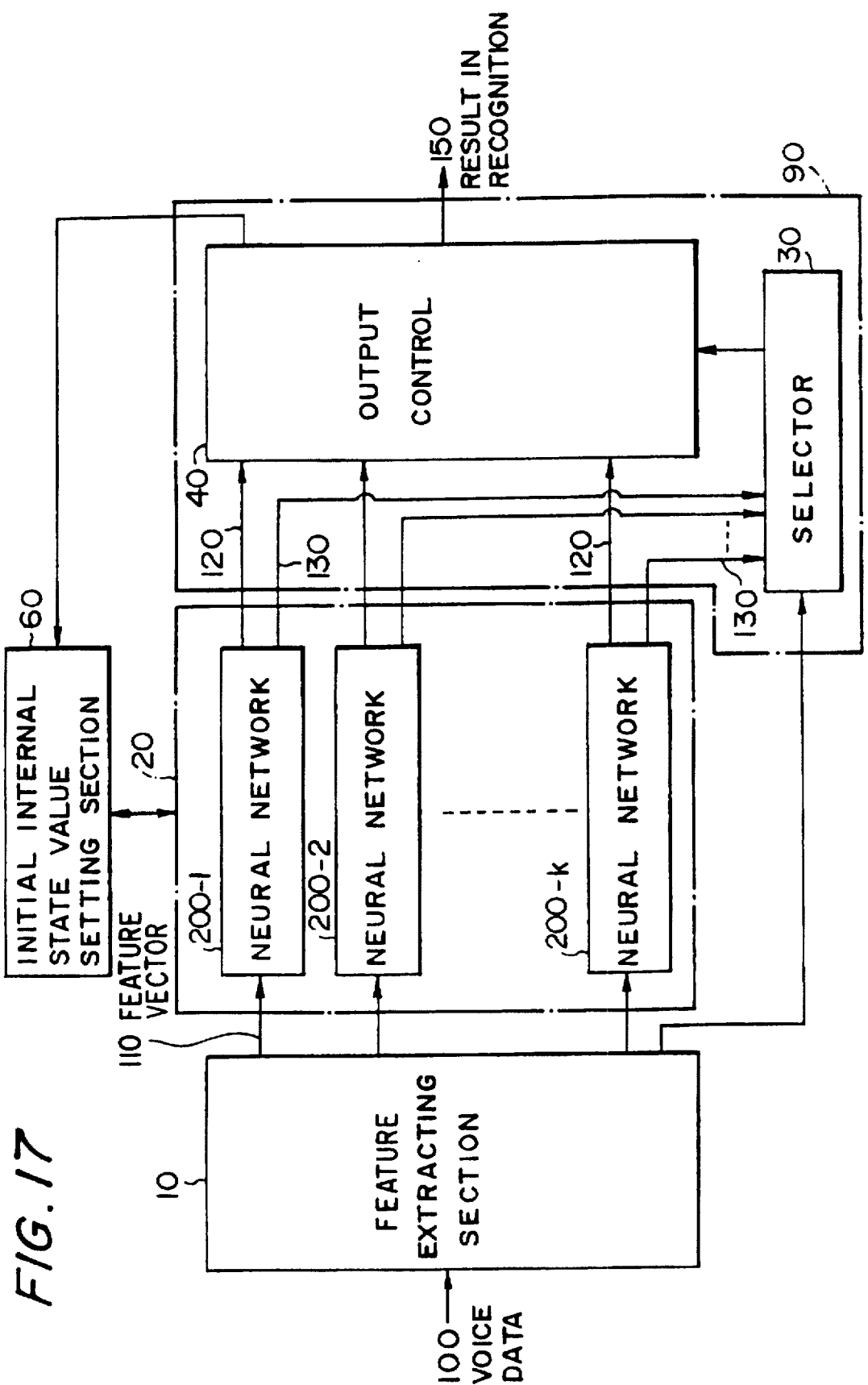
FIG. 17 is a block diagram of a speech recognition system used to recognize a speaker.

FIG. 17 shows a speech recognition system suitable for use in speaker recognition, wherein parts similar to those of the previous embodiments are denoted similar reference numerals and will not further be described.

The speech recognition system comprises a voice recognizing and processing section 20 which comprises a plurality of neural networks 200-1, 200-2 . . . 200-k for recognizing different speakers. Each of the neural networks has learned such that on the feature vector 110 of a particular speaker to be recognized, the neural network infers a feature vector to be inputted thereinto and outputs the inferred speaker vector as a adaptation judgment data 130 representing the adaptation in the speech recognition, in such a manner as described with respect to the previous embodiments. The amount of characteristic of the speaker used herein is eight-order PARCOR coefficient. However, such a coefficient may be replaced by any other coefficient. The PARCOR coefficient is preferred since its value in principle ranges between −1 and 1 and relatively highly depends on the speaker's feature.

The speech recognition system also comprises a speaker recognizing section 90 for computing the rate of coincidence between the adaptation judgment data 130 from each of the neural networks 200-1, 200-2 . . . 200-k and the feature vector 100 of the speaker actually inputted from the feature extracting section 10 for each neural network and for selecting a neural network 200 having the highest rate of coincidence. If the rate of coincidence of the selected neural network is equal to or higher than a predetermined level, the speaker recognizing section 90 judges that the voice data 100 inputted thereinto belongs to that of the speaker used to learn the selected neural network 200 and outputs the voice data 100 as a result in recognition 150. For example, if a neural network 200-1 for recognizing a speaker A is selected, the speaker recognizing section 90 judges that the voice data 100 inputted thereinto is that of the speaker A and outputs this voice data 100 as a result in recognition 150.

If the rate of coincidence of the selected neural network 200 is lower than the predetermined level, the speaker recognizing section 90 judges that the voice data 100 inputted therein is that of the speakers not to be recognized by all the neural networks 200-1, 200-2 . . . 200-k and similarly outputs a result in recognition 150.

The speaker recognizing section 90 may also be adapted to recognize the voice data in addition to the speaker recognition, as in the embodiment of FIG. 1. In such a case, the speaker recognizing section 90 further comprises a selector section 30 and an output control section 40.

The selector section 30 is adapted to compute and output a rate of coincidence to the output control section 40, for each of the neural networks 200-1, 200-2 . . . 200-k.

The output control section 40 is adapted to recognize a speaker having a voice data 100 inputted thereinto in response to the rate of coincidence from each of the neural networks. If the rate of coincidence shows the presence of a speaker to be recognized, the output control section 40 outputs a voice recognition data 120 from the selected neural network 200 as a result in recognition 150.

In such an arrangement, the speech recognition system can recognize not only speakers but also voice data from any recognized speaker. Thus, the speech recognition system can be applied to broader range of application.

Results actually obtained by using the speech recognition system of FIG. 17 will be described in detail below.

In practice, we used nine terms, "shuuten (terminal)", "udemae (skill)", "kyozetsu (rejection)", "chouetsu (transcendence)", "toriaezu (first of all)", "bunrui (classification)", "rokkaa (locker)", "sanmyaku (mountain range)" and "kakure pyuuritan (hidden Puritan)", as standard data for learning the neural networks. Voice data used herein were those of "the ATR phonetically labeled speach data base".

Figure 18:
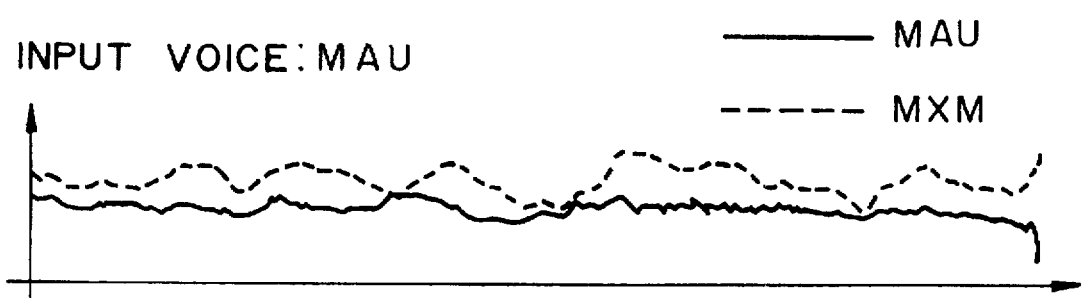
FIG. 18 is a graph showing results of speaker recognition obtained by the speech recognition system of FIG. 17.
Figure 19:
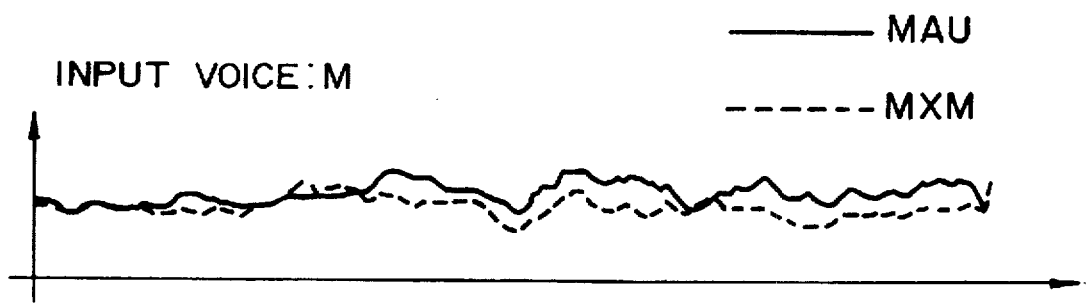
FIG. 19 is a graph showing results of speaker recognition obtained by the speech recognition system of FIG. 17.

FIGS. 18 and 19 show results of speaker recognition that were obtained from the neural networks learned in the above manner. The experiments performed the speaker recognition by using errors in feature vectors inferred by the neural networks and actual feature vectors, rather than the rate of coincidence therebetween.

In these figures, solid lines indicate variations in output error in a neural network learned to recognize the voice of a speaker MAU, through the passage of time while broken lines indicate variations in output error in another neural network learned to recognize the voice of a speaker MXM, through the passage of time. Errors indicated herein are those that were obtained by averaging the absolute lengths of error vectors generated from comparison between eight-order input vector data and output vector data, with respect to 32 frames before and after a frame in question. FIG. 18 shows data of the speaker MAU while FIG. 19 shows data of the speaker MXM.

As will be apparent from FIG. 18, the neural network learned by the voice of the speaker MAU has less errors on data restore while the other neural network learned by the voice of the speaker MXM has more errors on data restore. This means that the data restore can be performed with higher accuracy by using the speech characteristics of the speaker MAU. Namely, it clearly shows that the inputted voice data belongs to the speaker MAU.

On the other hand, FIG. 19 shows that the neural network learned by the voice of the speaker MXM has less errors on data restore. This means that the inputted voice data belongs to the speaker MXM.

As will be apparent from FIGS. 18 and 19, the speech recognition system of the present invention can accomplish a continuous speaker recognition.

The following table 1 indicates average errors obtained when eleven different voices, including the voices of the speakers MAU and MXM, are inputted into the aforementioned two neural networks. Terms to be learned were such nine terms as used previously. The averaging was carried out through all the speaking sections. As will be apparent from the table 1, each of the neural networks can recognize the voices of the speaker used in learning with minimum error. This means that these neural networks exactly recognize the voices of the speakers used in learning, among the voices of the eleven different speakers.

TABLE 1

| INPUT VOICE | VOICE USED IN LEARNING | |
|---|---|---|
| | MAU | MXM |
| MAU | 8.29 | 11.12 |
| MHT | 10.56 | 10.75 |
| MMS | 9.86 | 10.22 |
| MMY | 9.69 | 11.71 |
| MNM | 9.76 | 11.52 |
| MTK | 11.58 | 10.42 |
| MXM | 10.64 | 9.09 |
| FKN | 10.92 | 10.64 |
| FKS | 11.10 | 11.09 |
| FSU | 9.83 | 11.79 |
| FYN | 9.28 | 11.11 |

The following table 2 shows results similar to those of the table 1, but obtained when terms used herein are different from those used in the previous experiments. The used terms were "karendaa (calender)", "irassharu (come)", "kyokutan (extremity)", "chuusha (parking)", "puroguramu (program)", "rokuon (record)", "kounyuu (purchase)" and "taipyuutaa (typuter)".

TABLE 2

| INPUT VOICE | VOICE USED IN LEARNING | |
|---|---|---|
| | MAU | MXM |
| MAU | 8.98 | 12.16 |
| MHT | 10.99 | 11.18 |
| MMS | 10.26 | 10.75 |
| MMY | 10.55 | 12.71 |
| MNM | 10.32 | 12.28 |
| MTK | 12.17 | 10.86 |
| MXM | 10.20 | 9.68 |
| FKN | 11.09 | 11.14 |
| FKS | 11.00 | 12.00 |
| FSU | 10.40 | 12.27 |
| FYN | 9.80 | 12.07 |

As will be apparent from the table 2, the speech recognition system of the present invention can exactly recognize the different speakers even if the terms inputted are different from those previously used in learning.

The above description of experiments has been made with respect to discrete distribution of time, but may be applied to continuous process as by processing the data as analog data.

I claim:

1. A speech recognition system comprising:
   voice recognizing and processing means including a plurality of speech recognition neural networks that have previously learned different voice patterns to recognize given voice data, each of said speech recognition neural networks including means for judging whether or not a piece of input voice data coincides with one of the voice data to be recognized and outputting a recognition result and having means for outputting adaptation judgment data independent of the recognition result, the adaptation judgement data representing the adaptation in speech recognition;
   selector means receiving input voice data and data from said neural networks and responsive to the adaptation judgment data from each of said speech recognition neural networks for selecting one of said neural networks that has the highest adaptation in speech recognition; and output control means for outputting the result of speech recognition from the speech recognition neural network selected by said selector means.

2. A speech recognition system as defined in claim 1, further comprising feature extracting means for cutting the inputted voice data into each frame and transforming the inputted voice data into a feature vector, the transformed feature vectors being sequentially outputted from said feature extracting means, and wherein each of said speech recognition neural networks includes means for receiving the feature vectors from said feature extracting means as voice data.

3. A speech recognition system as defined in claim 2, wherein each of said speech recognition neural networks comprises a plurality of neurons connected to one another in a predetermined manner and set at an internal state value X, each of said neurons being formed as a dynamic neuron, the internal value X varying according to time for satisfying a function X=G (X, $Z_j$) represented by the use of the internal state value X and input data $Z_j$ (j=0, 1, 2, ..., n where n is a natural number) provided to that neuron, each of said dynamic neurons having means for converting the internal state value X into a value which satisfies the function F(X) and means for outputting said converted value as an output signal.

4. A speech recognition system as defined in claim 3, wherein each of the speech recognition neural networks comprises an input neuron for receiving the voice data, a recognition result output neuron for outputting the result of voice data recognition and an adaptation output neuron for outputting adaptation judgment data, said adaptation output neuron having means for inferring voice data to be inputted to said input neuron and means for outputting the inferred data as adaptation judgment data and wherein said selector means includes computing means for computing the adaptation of the inferred data relative to the actual voice data as adaptation in speech recognition.

5. A speech recognition system as defined in claim 4 wherein said function X=G (X, $Z_j$) is represented by $$\tau \frac{d}{dt} X = -X + \sum_{j=1}^{n} Z_j.$$

6. A speech recognition system as defined in claim 4 wherein said function X=G (X, $Z_j$) is represented by $$\tau \frac{d}{dt} X_i = -X_i + \sum_{j=1}^{n} W_{ij}Y_j + D_i + \theta_i$$

where $W_{ij}$ is strength in joining the output of the j-th neuron to the input of the i-th neuron; $D_i$ is an external input value; and $\theta_i$ is a biasing value.

7. A speech recognition system as defined in claim 4 wherein said function X=G (X, $Z_j$) is represented by $$\tau \frac{d}{dt} X = -X + S \left( \sum_{j=1}^{n} Z_j \right)$$

using the sigmoid function S.

8. A speech recognition system as defined in claim 4 wherein said function X=G (X, $Z_j$) is represented by $$\tau \frac{d}{dt} X_i = -X_i + S \left( \sum_{j=1}^{n} W_{ij}Y_j + D_i + \theta_i \right)$$

where the sigmoid function S is used and where $W_{ij}$ is strength in joining the output of the j-th neuron to the input of the i-th neuron; $D_i$ is an external input value; and $\theta_i$ is a biasing value.

9. A speech recognition system as defined in claim 4 wherein said function F (X) used in each of said dynamic neurons is the sigmoid function.

10. A speech recognition system as defined in claim 4 wherein said function F (X) used in each of said dynamic neurons is the threshold function.

11. A speech recognition system as defined in claim 4 wherein said input data $Z_j$ provided to each of said dynamic neurons includes feedback data obtained from the output of that neuron multiplied by a weight.

12. A speech recognition system as defined in claim 4 wherein said input data $Z_j$ provided to each of said dynamic neurons includes data obtained from the output of any other neuron multiplied by a weight.

13. A speech recognition system as defined in claim 4 wherein said input data $Z_j$ provided to each of said dynamic neurons includes externally provided data.

14. A speech recognition system as defined in claim 3 wherein said function X=G (X, $Z_j$) is represented by $$\tau \frac{d}{dt} X = -X + \sum_{j=1}^{n} Z_j.$$

15. A speech recognition system as defined in claim 3 wherein said function X=G (X, $Z_j$) is represented by $$\tau \frac{d}{dt} X_i = -X_i + \sum_{j=1}^{n} W_{ij}Y_j + D_i + \theta_i$$

where $W_{ij}$ is strength in joining the output of the j-th neuron to the input of the i-th neuron; $D_i$ is an external input value; and $\theta_i$ is a biasing value.

16. A speech recognition system as defined in claim 3 wherein said function X=G (X, $Z_j$) is represented by $$\tau \frac{d}{dt} X = -X + S \left( \sum_{j=1}^{n} Z_j \right)$$

using the sigmoid function S.

17. A speech recognition system as defined in claim 3 wherein said function X=G (X, $Z_j$) is represented by $$\tau \frac{d}{dt} X_i = -X_i + S \left( \sum_{j=1}^{n} W_{ij}Y_j + D_i + \theta_i \right)$$

where the sigmoid function S is used and where $W_{ij}$ is strength in joining the output of the j-th neuron to the input of the i-th neuron; $D_i$ is an external input value; and $\theta_i$ is a biasing value.

18. A speech recognition system as defined in claim 1, wherein each of said speech recognition neural networks comprises a plurality of neurons connected to one another in a predetermined manner and set at an internal state value X, each of said neurons being formed as a dynamic neuron, the internal value X varying according to time for satisfying a function X=G (X, $Z_j$) represented by the use of the internal state value X and input data $Z_j$ (j=0, 1, 2, ..., n where n is a natural number) provided to that neuron, each of said dynamic neurons including means for converting the internal state value X into a value which satisfies the function F(X) and means for outputting said converted value as an output signal.

19. A speech recognition system as defined in claim 18 wherein said function X=G (X, $Z_j$) is represented by $$\tau \frac{d}{dt} X = -X + \sum_{j=1}^{n} Z_j.$$

20. A speech recognition system as defined in claim 18 wherein said function X=G (X, $Z_j$) is represented by $$\tau \frac{d}{dt} X_i = -X_i + \sum_{j=1}^{n} W_{ij}Y_j + D_i + \theta_i$$

where $W_{ij}$ is strength in joining the output of the j-th neuron to the input of the i-th neuron; $D_i$ is an external input value; and $\theta_i$ is a biasing value.

21. A speech recognition system as defined in claim 18 wherein said function X=G (X, $Z_j$) is represented by $$\tau \frac{d}{dt} X = -X + S\left( \sum_{j=1}^{n} Z_j \right)$$

using the sigmoid function S.

22. A speech recognition system as defined in claim 18 wherein said function X=G (X, $Z_j$) is represented by $$\tau \frac{d}{dt} X_i = -X_i + S\left( \sum_{j=1}^{n} W_{ij}Y_j + D_i + \theta_i \right)$$

where the sigmoid function S is used and where $W_{ij}$ is strength in joining the output of the j-th neuron to the input of the i-th neuron; $D_i$ is an external input value; and $\theta_i$ is a biasing value.

23. A speech recognition system as defined in claim 1, further comprising an internal state value setting section including means for receiving data from said output control means.

24. A speech recognition system comprising:

feature extracting means for cutting and convert input voice data into a feature vector for each frame, said feature vectors being sequentially outputted from said feature extracting means;

voice recognizing and processing means including a plurality of speech recognition neural networks each having learned to infer a feature vector of a speaker based on a feature vector of a speaker inputted from said feature extracting means into that speech recognition neural network for outputting that inferred vector as adaptation judgement data representing the adaption in the speech recognition, said each speech recognition neural network being formed to output said adaptation judgement data based on a feature vector actually inputted from said feature extracting means; and speaker recognizing means for computing the rate of coincidence between the adaptation judgment data from each of said speech recognition neural network means and the feature vector of the speaker actually inputted from said feature extracting means into said each speech recognition neural network to recognize the speaker of the inputted voice for each of said speech recognition neural network.

25. A speech recognition system as defined in claim 24, wherein each of said speech recognition neural networks comprises a plurality of neurons connected to one another and set at an internal state value X, each of said neurons being formed as a dynamic neuron, the internal value X varying according to time for satisfying a function X=G (X, $Z_j$) represented by the use of the internal state value X and input data $Z_j$ (j=0, 1, 2, ..., n where n is a natural number) provided to that neuron, each of said dynamic neurons including means for converting the internal state value X into a value which satisfies the function F(X) and means for outputting said converted value as an output signal.

26. A speech recognition system as defined in claim 25, wherein each of said speech recognition neural networks comprises an input neuron for receiving said feature vector and an adaptation output neuron for outputting said adaptation judgment data, said adaptation output neuron being having means for inferring said feature vector inputted thereinto and means for outputting the inferred data as an adaptation judgment data.

* * * * *